United States Patent
Niwa et al.

(10) Patent No.: US 8,593,003 B2
(45) Date of Patent: Nov. 26, 2013

(54) OUTDOOR POWER GENERATING APPARATUS

(75) Inventors: Tomoaki Niwa, Nagoya (JP); Hiroshi Kamiya, Kariya (JP); Yoshinobu Nakano, Toyota (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 275 days.

(21) Appl. No.: 13/159,723

(22) Filed: Jun. 14, 2011

(65) Prior Publication Data

US 2011/0310532 A1    Dec. 22, 2011

(30) Foreign Application Priority Data

Jun. 16, 2010 (JP) ................................. 2010-137052

(51) Int. Cl.
*B60L 1/02* (2006.01)

(52) U.S. Cl.
USPC ............................................................. 290/2

(58) Field of Classification Search
USPC .............................................. 290/2, 1 A, 1 B
See application file for complete search history.

(56) References Cited

U.S. PATENT DOCUMENTS

| | | | |
|---|---|---|---|
| 7,177,148 B2 | 2/2007 | Nakata et al. | |
| 2010/0015491 A1* | 1/2010 | Yamanis | 429/30 |
| 2011/0303482 A1* | 12/2011 | Niwa et al. | 181/228 |

FOREIGN PATENT DOCUMENTS

| | | |
|---|---|---|
| DE | 101 43 167 A1 | 3/2003 |
| GB | 1 563 021 | 3/1980 |
| JP | 2002-285858 | 10/2002 |
| JP | 2003-90224 | 3/2003 |
| JP | 2004-357474 | 12/2004 |
| JP | 2007-172946 | 7/2007 |
| JP | 2008-108451 | 5/2008 |
| JP | 2009-76286 | 4/2009 |
| WO | WO 2010/060482 A1 | 6/2010 |

OTHER PUBLICATIONS

Extended European Search Report issued Jul. 19, 2012, in Patent Application No. 11169571.4.
U.S. Appl. No. 13/159,715, filed Jun. 14, 2011, Niwa, et al.

* cited by examiner

*Primary Examiner* — Javaid Nasri
(74) *Attorney, Agent, or Firm* — Oblon, Spivak, McClelland, Maier & Neustadt, L.L.P.

(57) ABSTRACT

An outdoor power generating apparatus includes a housing placed at an outside and including a power generation chamber, a power generation source accommodated in the power generation chamber and formed by either one of an engine and a fuel cell, an intake portion provided within the housing and positioned at an upper side of the power generation source, the intake portion including an outside air inlet portion that opens to a side wall of the housing to bring an outside air, the intake portion including a meander passage that connects the outside air inlet portion to the power generation chamber while bringing the outside air to meander from the outside air inlet portion towards the power generation chamber, and a drain port provided at the meander passage and discharging a water in a liquid state that remains at the meander passage to an outside of the meander passage.

17 Claims, 10 Drawing Sheets

F I G. 1
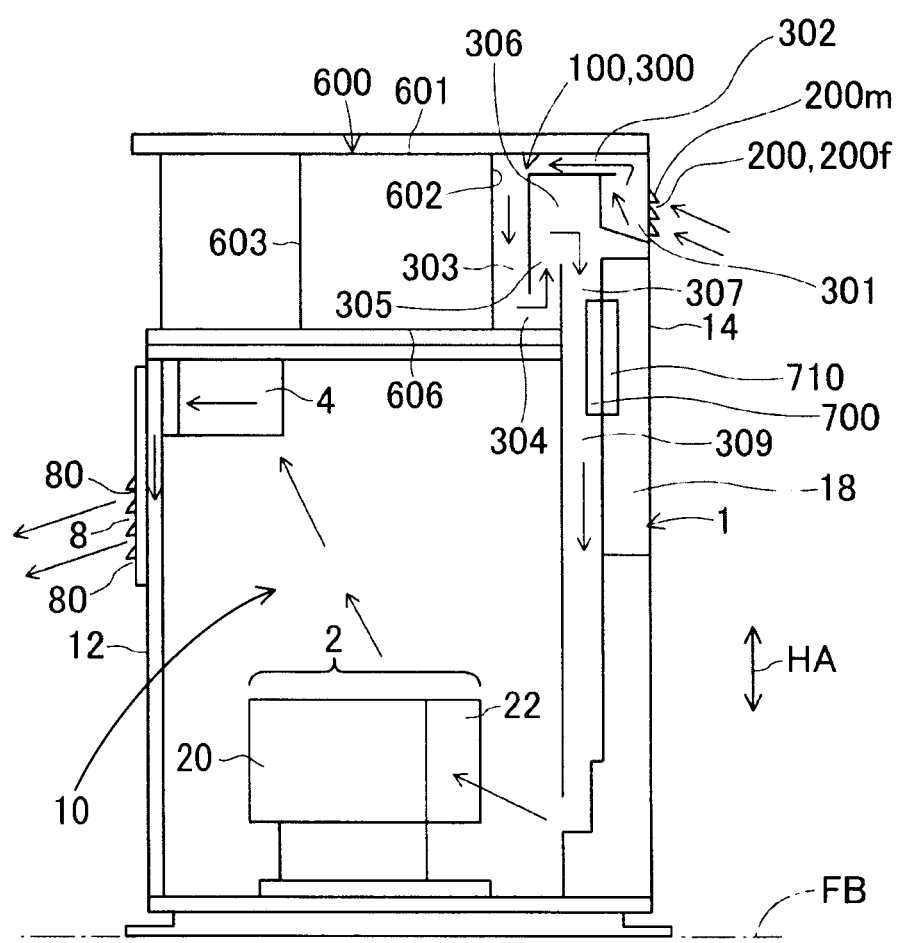

US 8,593,003 B2

OUTDOOR POWER GENERATING APPARATUS

CROSS REFERENCE TO RELATED APPLICATIONS

This application is based on and claims priority under 35 U.S.C. §119 to Japanese Patent Application 2010-137052, filed on Jun. 16, 2010, the entire content of which is incorporated herein by reference.

TECHNICAL FIELD

This disclosure generally relates to an outdoor power generating apparatus.

BACKGROUND DISCUSSION

JP2004-357474A (which will be hereinafter referred to as Reference 1) discloses an outdoor power conditioner including a housing in which an air intake port (an outside air intake port), a ventilation fan, and an air exhaust passage are integrally formed. The air exhaust passage has an inclination allowing rainwater to be discharged to an outside of the power conditioner. The intake port is formed at a bottom surface of the housing so as to face a ground plane. JP2008-108451A (which will be hereinafter referred to as Reference 2) discloses a fuel cell case including an inner wall body that accommodates a fuel cell and an outer wall body that surrounds the inner wall body. An exterior opening portion formed at the outer wall body, and a connection portion provided between the outer wall body and the inner wall body and formed at the inner wall body are positioned differently from each other in a vertical direction to thereby restrain the rainwater from entering the case. JP2009-76286A (which will be hereinafter referred to as Reference 3) discloses a fuel cell system including an air intake port (an outside air intake port) provided at a ceiling surface of a package of the fuel cell system. An exhaust heat from the system warms the ceiling surface of the package to thereby restrain a decrease of an air intake level of the system caused by a snow accumulation.

According to the power conditioner disclosed in Reference 1, because the air intake port opens at the bottom surface of the housing, rainwater may enter the housing through an air exhaust port formed at a side surface of the housing. In addition, the power conditioner disclosed in Reference 1 does not include a means to prevent an intrusion of snow such as powder snow into the housing. Further, the air intake port through which an outside air is taken in is formed at the bottom surface of the housing. Thus, depending on an installation condition of a package unit of the power conditioner installed outside, the air intake port may be closed or covered by accumulating snow. According to the fuel cell case disclosed in Reference 2, an outside air intake port is arranged at a lower portion of a side wall of the case. Therefore, in the same way as the power conditioner disclosed in Reference 1, the outside air intake port may be closed or covered by the accumulating snow. According to the fuel cell system disclosed in Reference 3, because the air intake port is formed at the ceiling surface of the package, melting of snow may be expected at the ceiling surface. However, the fuel cell system does not include a means to prevent an intrusion of snow during a storm from sides of the system. A structure to eliminate the snow entering the air intake port is not provided at the fuel cell system.

Consequently, according to References 1 to 3, a prevention structure preventing an intrusion of snow such as powder snow from the outside air intake port to the housing is not sufficiently effective.

A need thus exists for an outdoor power generating apparatus which is not susceptible to the drawback mentioned above.

SUMMARY

According to an aspect of this disclosure, an outdoor power generating apparatus includes a housing placed at an outside and including a power generation chamber, a power generation source accommodated in the power generation chamber and formed by either one of an engine driving a generator and a fuel cell generating an electric power by a fuel and an oxidant, an intake portion provided within the housing and positioned at an upper side of the power generation source, the intake portion including an outside air inlet portion that opens to a side wall of the housing to bring an outside air within the housing, the intake portion including a meander passage that connects the outside air inlet portion to the power generation chamber while bringing the outside air to meander from the outside air inlet portion towards the power generation chamber, and a drain port provided at the meander passage and discharging a water in a liquid state that remains at the meander passage to an outside of the meander passage.

According to another aspect of this disclosure, an outdoor power generating apparatus includes a housing placed at an outside and including a power generation chamber, a power generation source accommodated in the power generation chamber and formed by either one of an engine driving a generator and a fuel cell generating an electric power by a fuel and an oxidant, an intake portion provided within the housing and positioned at an upper side of the power generation source, the intake portion including an outside air inlet portion that opens to a side wall of the housing to bring an outside air within the housing, the intake portion including a meander passage that connects the outside air inlet portion to the power generation chamber while bringing the outside air to meander from the outside air inlet portion towards the power generation chamber, a wall downwardly inclining to the outside air inlet portion, and a drain port provided at the meander passage and discharging a water in a liquid state that remains at the meander passage to an outside of the meander passage.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a schematic view illustrating an inner structure of a housing according to first to fourth embodiments disclosed here;

DETAILED DESCRIPTION

[First Embodiment]

Figure 2A:
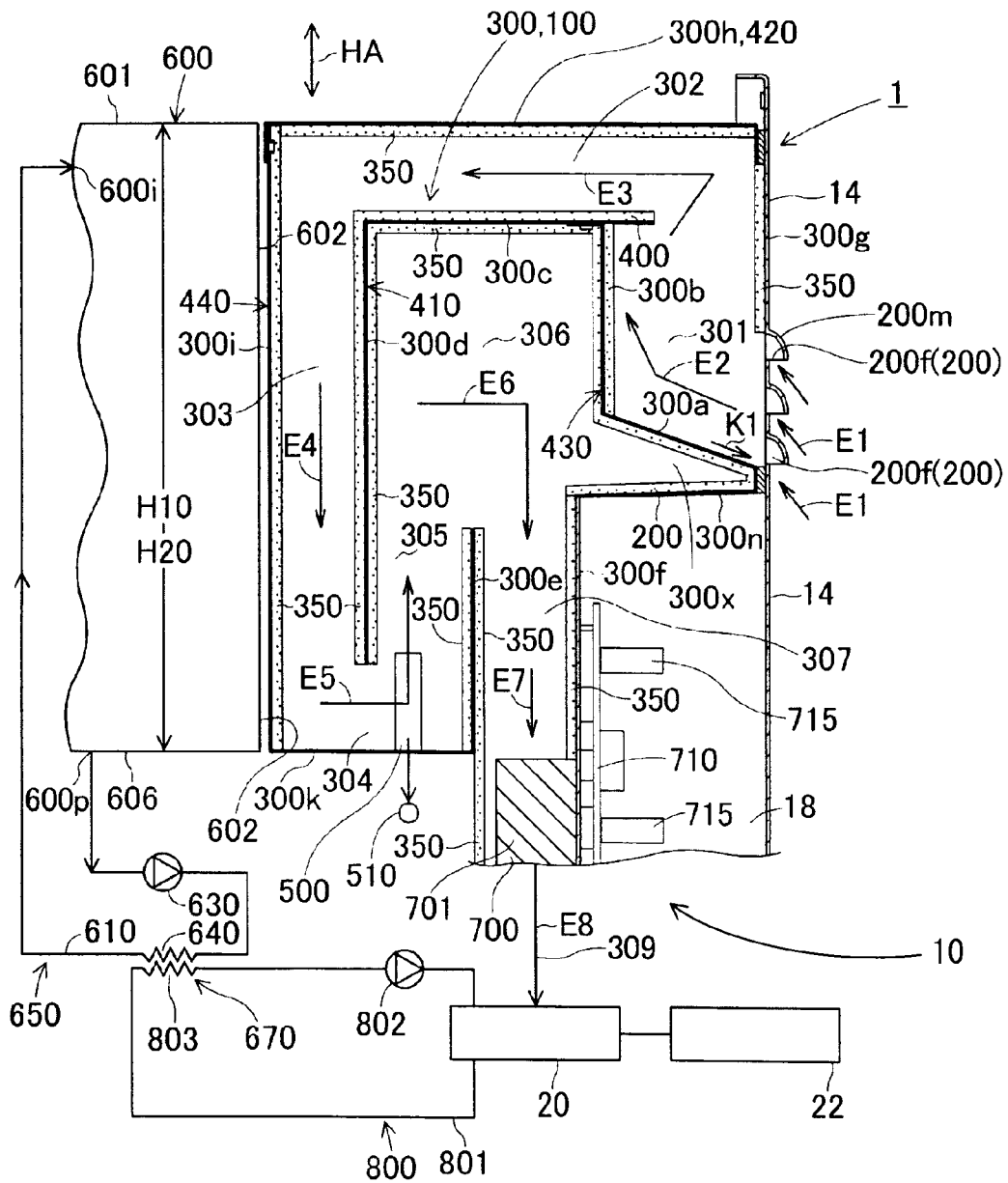
FIG. 2A is a cross-sectional view illustrating a structure of an intake portion provided at the housing according to the first to fourth embodiments.

A first embodiment will be explained with reference to FIGS. 1 to 4. An outdoor power generating apparatus (which will be hereinafter simply referred to as a power generating apparatus), which is installed or placed outdoors, may be suitable in cold environments where snowstorms occur, during the wintertime, and the like. The power generating apparatus generates an electric power by a generator 22 driven by an engine 20 and utilizes an exhaust heat from the engine 20 as a hot liquid. As illustrated in FIG. 1, the power generating apparatus according to the present embodiment includes a housing 1, a power generation source 2, an intake portion 100, and an exhaust portion (i.e., an exhaust passage) 4. The housing 1, substantially having a rectangular box shape, includes a power generation chamber 10 serving as an engine compartment at a lower portion. The power generation source 2 is provided at the power generation chamber 10 of the housing 1. The intake portion 100 is provided at the housing 1 so as to be positioned at an upper side of the power generation chamber 10. The exhaust portion 4 discharges air in the power generation chamber 10 such as an exhaust from the engine 20 as an exhaust gas. The housing 1 includes exterior panels 12 and 14 serving as side walls vertically formed relative to a ground plane FB. The exterior panel 14 includes an outside air inlet portion 200 connected to the outside air. The exterior panel 12 includes an exhaust port 8 connected to the outside air. The exhaust port 8 includes multiple openings (laterally-elongated bores) 80.

Figure 3:
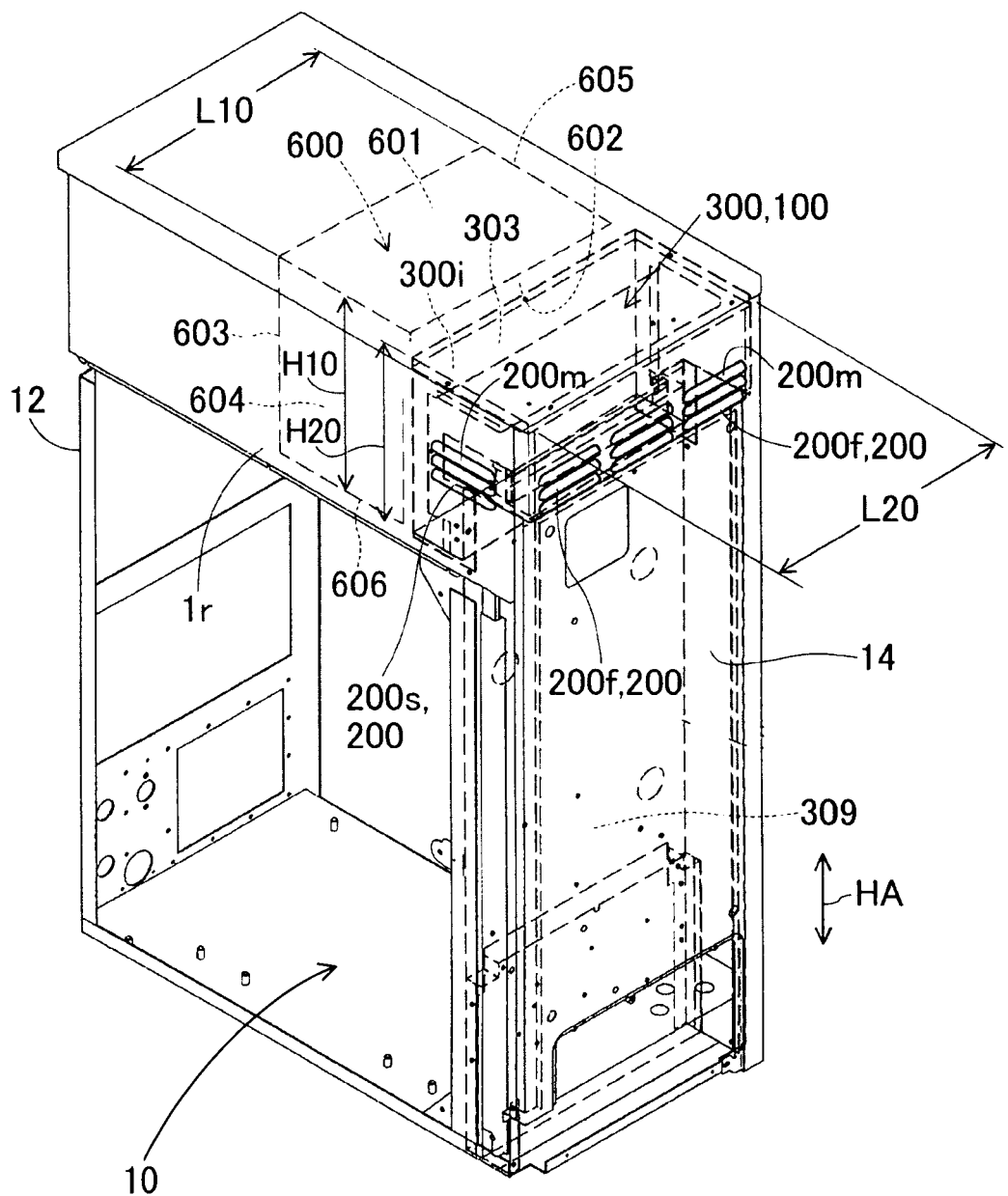
FIG. 3 is a perspective view illustrating a schematic structure of the intake portion and a hot water tank provided at the housing according to the first to fourth embodiments.

As illustrated in FIG. 2A, the intake portion 100 is provided to supply the outside air to the power generation chamber 10. The intake portion 100 includes the outside air inlet portion 200 and a meander passage 300. The outside air inlet portion 200 opens to the exterior panel 14 of the housing 1 and brings the outside air within the housing 1. The meander passage 300 connects the outside air inlet portion 200 to the power generation chamber 10 so as to bring the outside air to the power generation chamber 10 while causing the outside air to turn or meander in a height direction of the power generating apparatus as indicated by an arrow HA in FIG. 2A. As illustrated in FIG. 3, the outside air inlet portion 200 includes a first inlet portion 200f provided at an upper portion of the exterior panel 14 of the housing 1 so as to open at a side of the exterior panel 14, and a second inlet portion 200s provided at a rear surface 1r of the housing 1 so as to open at a side of the rear surface 1r. The first inlet portion 200f and the second inlet portion 200s extend in a lateral (horizontal) direction of the power generating apparatus while including cover portions 200m respectively. The second inlet portion 200s may be connected only to a first upward passage 301 (to be explained later) of the meander passage 300 while not being connected to a second diversion passage 306 (to be explained later), and the like of the meander passage 300. In a case where the power generating apparatus is installed outdoors, the housing 1 is generally positioned so that the exterior panel 14 including the first inlet portion 200f is away from a building, a wall or the like while the rear surface 1r faces the building, the wall, or the like so as to be close thereto. In a case where a windblast excessively enters the housing 1 through the first inlet portion 200f, a static pressure within the housing 1 may increase excessively. However, the second inlet portion 200s functions so as to let the excessive static pressure within the housing 1 to the outside. Further, according to the present embodiment, the intake portion 100 including the outside air inlet portion 200 is arranged at the highest portion of the housing 1. Thus, even with an increased accumulation of snow, the outside air inlet portion 200 may be restrained from being buried by the accumulated snow.

As illustrated in FIG. 2A, the meander passage 300 includes a labyrinth structure where the passage turns multiple times in the height direction (i.e., in the arrow HA direction). The meander passage 300 includes the first upward passage 301, a first lateral passage 302, a first downward passage 303, a first diversion passage 304, a second upward passage 305, the second diversion passage 306, and a second downward passage 307. The first upward passage 301 is connected to the outside air inlet portion 200 of the exterior panel 14 so as to face the outside air inlet portion 200. The first lateral passage 302 laterally extends from an end (an upper end) of the first upward passage 301. The first downward passage 303 extends downward from an end of the first lateral passage 302. The first diversion passage 304 extends from an end (a lower end) of the first downward passage 303 so as to change a flow direction of air from a downward direction to an upward direction. The second upward passage 305 extends upward from the first diversion passage 304. The second diversion passage 306 extends from an end (an upper end) of the second upward passage 305 so as to change the flow direction of the air from the upward direction to the downward direction. The second downward passage 307 extends downward from the second diversion passage 306 towards the power generation chamber 10. According to the meander passage 300 having the aforementioned vertical labyrinth structure, a flow passage thereof is separated into multiple portions while bending instead of being formed into a large hollow shape. Therefore, a powder snow and the like that enters the meander passage 300 may be restrained from excessively flowing within the meander passage 300.

As illustrated in FIG. 2A, the meander passage 300 includes walls 300a, 300b, 300c, 300d, 300e, 300f, 300g, 300h, 300i, 300k, 300n, and the like (hereinafter referred to as walls 300a to 300n when they are collectively described) so as to have a labyrinth passage shape. Lining layers 350 made of a porous material such as form (for example, foamed urethane resin) having a sound absorbability are lined at the walls 300a to 300n respectively. Specifically, the lining layers 350 serving as sound absorbing layers are provided at inner wall surfaces of the walls 300a to 300n. Accordingly, a driving noise from the engine 20, the generator 22, and the like at the power generation chamber 10 is restrained from leaking to the outside of the power generating apparatus. When considering a heat transfer from the power generation chamber 10, the wall 300k may be prevented from being lined by the lining layer. In this case, even with an intrusion of heavy snow to the housing 1, freezing in the vicinity of a drain port 500 provided at the wall 300k may be restrained, thereby ensuring a drainage performance. However, the lining layer may be lined at the wall 300k.

As illustrated in FIG. 2A, a projecting portion 400 having a hood shape is provided at a boundary section between the first upward passage 301 and the first lateral passage 302. The projecting portion 400 projects towards the exterior panel 14 so as to laterally extend from an upper end of the wall 300b extending in a vertical direction and facing the exterior panel 14 at which the outside air inlet portion 200 is formed. According to the present embodiment, the projecting portion 400 is provided at the wall 300b (one of the walls 300a to 300n). That is, the projecting portion 400 extends in a direction perpendicular to the flow direction of the air flowing through the meander passage 300. Depending on weather conditions and the like, a strong driving wind may cause the powder snow, rainwater, and the like to enter the first upward passage 301, together with the outside air, in an arrow E direction from the outside air inlet portion 200 of the housing 1. Even in such case, the wall 300b arranged so as to stand in the vertical direction while directly facing the outside air inlet portion 200 (specifically, the first inlet portion 200f) functions as a stopper wall. Thus, the snow that enters the first upward passage 301 from the outside air inlet portion 200 hits the wall 300b, thereby restraining a further intrusion of the snow, rainwater, and the like.

Further, as seen from FIG. 2A, the snow such as the powder snow is highly likely to hit the projecting portion 400 serving as a baffle plate member before flowing to the first lateral passage 302 from the first upward passage 301. Thus, the further intrusion of the snow is restrained. The snow and the like hitting the wall 300b and/or the projecting portion 400 may remain at the wall 300a having an inclined shape towards the first inlet portion 200f. At this time, because a void 300x arranged at a lower side of the inclined wall 300a constitutes a portion of the meander passage 300, the void 300x is affected by heat of a hot water tank 600 serving as a hot liquid tank and a heat supply portion, and the power generation chamber 10. The inclined wall 300a inclines downwardly to the first inlet portion 200f. Therefore, the snow and the like positioned at an upper surface of the inclined wall 300a is expected to melt and to flow down to the outside of the first inlet portion 200f of the outside air inlet portion 200 in an arrow K1 direction by the gravity.

Figure 4:
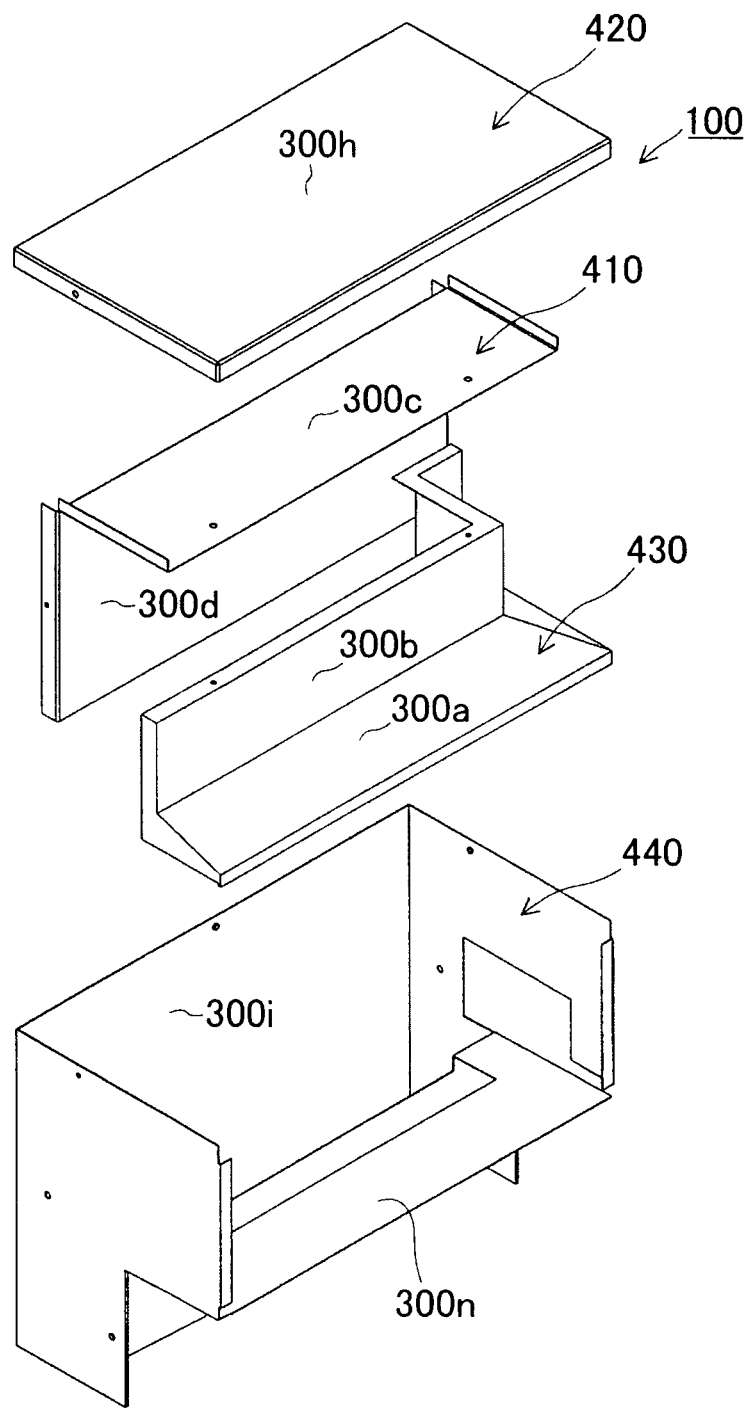
FIG. 4 is an exploded perspective view of the intake portion provided at the housing according to the first to fourth embodiments.

As illustrated in FIG. 4, the walls 300c and 300d form a partition member 410. The wall 300h forms a ceiling cover 420. The walls 300a and 300b form a wind receiving member 430. The walls 300i, 300n, and the like form a main body 440 of the intake portion 100.

As illustrated in FIG. 2A, the drain port 500 is provided at a bottom portion in an intermediate area of the meander passage 300, i.e., provided at the first diversion passage 304. The drain port 500 is an opening to cause water in a liquid state (hereinafter simply referred to as water) that remains at the meander passage 300 to naturally flow down to the outside thereof so as to be discharged to a drain portion 510.

The hot water tank 600 for a domestic use or a business use stores a hot water. The hot water in the hot water tank 600 is supplied to a hot water supply system such as a heating system, a kitchen and a bathroom by means of a hot water plumbing. The hot water tank 600, which is formed into a rectangular box shape, includes wall surfaces 601, 602, 603, 604, 605, and 606. The wall surface 602 serving as a side surface of the hot water tank 600 is arranged next to the first downward passage 303 of the meander passage 300 so as to face the first downward passage 303 via the wall 300i. The wall 602 of the hot water tank 600 transmits the heat to the meander passage 300. In a case where the power generating apparatus performs a power generating operation, the heat generated upon operation of the engine 20 is stored as the hot water in the hot water tank 600 to thereby obtain a heat accumulation or a heat storage. As illustrated in FIG. 2A, the engine 20 includes an engine cooling water circulation means 800 so as to cool down the engine 20. The engine cooling water circulation means 800 includes a circulation passage 801 and circulating an engine cooling water heated by the exhaust heat of the engine 20, a pump 802 (i.e., an engine cooling water delivery source) provided at the circulation passage 801, and a heat transfer portion 803 having a heat exchange function.

As illustrated in FIG. 2A, a hot water tank passage 650 is provided so as to be heated by the engine cooling water heated by the exhaust heat of the engine 20. The hot water tank passage 650 includes a circulation passage 610 and connected to an entrance 600i at an upper side and an exit 600p at a lower side of the hot water tank 600, a pump 630 (a cooling water delivery source), and a heat transfer portion 640. The heat transfer portions 640 and 803 form a heat exchanger 670. The heat exchanger 670 transmits the heat of the engine cooling water at a high temperature flowing through the circulation passage 801 of the engine cooling water circulation means 800 to the water in the hot water tank passage 650 to thereby obtain the hot water. The hot water is acquired from the exit 600p of the hot water tank 600 and is supplied to the entrance 600i. The hot water is thus stored and the heat thereof is accumulated in the hot water tank 600. Generally, the temperature of the hot water in the hot water tank 600 may fall within a range from 35° C. to 80° C.

As understood from FIG. 2A, the hot water tank 600 and the meander passage 300 are arranged next to each other while facing each other. Thus, the heat of the hot water tank 600 is transmitted via the wall 300i to the first downward passage 303, which is positioned at an upstream side of the drain port 500, of the meander passage 300. At this time, the heat transfer includes a heat conduction and a heat radiation. The heat, by which the snow such as the powder snow entering the meander passage 300 is melted, is transmitted from the hot water tank 600 to the first downward passage 303 and further to the entire meander passage 300. In addition, in a case where the engine 20 is driven, the power generation chamber 10 is heated by a radiation of the engine 20. The heat of the power generation chamber 10 is thus transmitted to the meander passage 300, specifically to the first diversion passage 304 provided at the upper side of the power generation chamber 10, via the wall 300k and the like. Therefore, even when the snow enters the meander passage 300 from the outside air inlet portion 200 because of the adverse weather conditions, the snow entering the meander passage 300 is immediately melted to be formed into water.

As illustrated in FIG. 3, provided a height of the hot water tank 600 is defined to be H10 and a height of the first downward passage 303 is defined to be H20 in a state where the hot water tank 600 and the meander passage 300 are arranged next to each other, the height H10 may be equal to or substantially equal to the height H20 in view of the heat transfer from the hot water tank 600 to the meander passage 300. The hot water tank 600 may face the meander passage 300 via two thirds or more of the height H10. However, as long as the hot water tank 600 and the meander passage 300 are arranged next to each other, the heights H10 and H20 are not limited to have the aforementioned relationship. In addition, as illustrated in FIG. 3, provided a width (a length) of the hot water tank 600 is defined to be L10 while a width (a length) of the first downward passage 30 is defined to be L20, the length L10 may be equal to or substantially equal to the length L20 in view of the heat transfer from the hot water tank 600 to the meander passage 300. An area where the heat is transferred from the hot water tank 600 to the meander passage 300 is ensured accordingly. The hot water tank 600 may face the meander passage 300 via two thirds or more of the length L10.

Figure 2B:
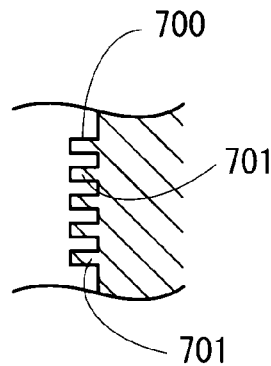
FIG. 2B is a partial enlarged view of a heat sink illustrated in FIG. 2A.

Even in a case where the power generation source 2 is not driven, the hot water tank 600 still stores the hot water to thereby radiate the heat. Thus, the snow entering the meander passage 300 is melted even when the power generation source 2 is not operated. Further, because the hot water stored in the hot water tank 600 has a large specific heat, the hot water tank 600 has a large heat capacity so as to be suitable as a heat source to melt the snow. In order to improve efficiency of the heat conductivity from the hot water tank 600 to the meander passage 300, the wall 300i disposed between the hot water tank 600 and the meander passage 300 may be made of metal having a high heat conductivity and a high corrosion resistance such as carbon steel, alloy steel, aluminum, aluminum alloy, copper, and copper alloy. In addition, in order to enhance a heat receiving rate of a radiation heat from the hot water tank 600, a surface of the wall 300i facing the hot water tank 600 may be colored in black. At this time, however, the hot water tank 600 may be colored in other colors. As illustrated in FIG. 2A, a heat sink 700 is provided to cool down a control board 710. The heat sink 700 is made of a material having the high heat conductivity such as aluminum alloy and copper alloy. As illustrated in FIG. 2B, the heat sink 700 includes multiple projections 701 to thereby increase radiation areas. The heat sink 700 may be arranged at the second downward passage 307 that is positioned at a downstream area of the meander passage 300.

As illustrated in FIG. 2A, the control board 710 at which electrical components 715 including electronic components are mounted is arranged within a control chamber 18 of the housing 1. The control chamber 18 is substantially completely sealed relative to the second downward passage 307 by means of the wall 300f. Therefore, the air, the snow, and the like flowing through the meander passage 300 are restrained from entering the control chamber 18. The control board 710 is appropriately protected accordingly. As illustrated in FIG. 2A, the control board 710 and the heat sink 700 oppose each other via the wall 300f formed to extend in the vertical direction. In a case where the heat sink 700 is cooled by the air flowing through the meander passage 300, the control board 710 that is thermally in contact with the heat sink 700 is also cooled, thereby restraining overheat of the control board 710 to which the electrical components 715 that tend to generate heat are attached. The control board 710 in the control chamber 18 emits heat when operating, which leads to a melting of the snow, and the like by warming up the meander passage 300.

In a case where a fuel such as a gas fuel or a liquid fuel is supplied to the engine 20 and the air in the power generation chamber 10 is supplied to the engine 20, the engine 20 is driven. Then, the generator 22 connected to a drive shaft of the engine 20 is driven to generate the electric power. The electric power generated by the generator 22 is used to charge a capacitor, drive an electric power load such as a light, a motor, and a heater. As described above, the radiation heat from the engine 20 creates the hot water by means of the heat exchanger 670. The hot water is stored at the hot water tank 600. Thus, when the power generating apparatus according to the present embodiment is driven, the hot water tank 600 is generally maintained at a temperature range from 35° C. to 80° C., for example, though it depends on the driving condition of the engine 20, the weather conditions, the usage condition of the hot water, and the like. Further, the power generation chamber 10 is maintained at a temperature range from 40° C. to 80° C. though it depends on the driving condition of the engine 20, the weather conditions, and the like. When the engine 20 is driven, a combustion chamber of the engine 20 intermittently generates a negative pressure because of a piston operation. Thus, as seen from FIG. 2A, the air outside the housing 1 flows from the outside air inlet portion 200 in E1, E2, E3, E4, E5, E6, E7, and E8 directions through the meander passage 300 to pass through the heat sink 700 so as to be supplied to the power generation chamber 10 via a connection passage 309.

According to the present embodiment, in a case where the weather conditions are severe so that a strong driving wind is generated, in the wintertime, in the cold environments, and the like, the snow such as the powder snow may enter the housing 1 from the outside air inlet portion 200 of the housing 1 through the meander passage 300 and then may freeze therein. Such incident is unfavorable. Then, according to the present embodiment, the meander passage 300 is formed so as to bend multiple times in the height direction of the housing 1, i.e., in the arrow HA direction. Therefore, the snow is highly likely to hit the walls 300a to 300n of the meander passage 300. As a result, though the snow remains at the meander passage 300, the snow is unlikely to enter the power generation chamber 10. Durability of the engine 20, the generator 22, various components and members accommodated within the power generation chamber 10 is ensured, which leads to a long-life thereof. An intrusion of the rainwater is also restrained.

The snow such as the powder snow that remains within the meander passage 300 of the intake portion 100 is gradually melted by means of the heat transfer from the power generation chamber 10 and further the heat transfer from the engine 20 and the generator 22 of the power generation source 2 to thereby form the water, which then flows down by the gravity. This is because, as long as the power generating apparatus performs the power generating operation, the temperature of the power generation chamber 10 is higher than the outside temperature. The water is discharged to the outside of the meander passage 300 from the drain port 500. The melting of the snow that remains at the meander passage 300 of the intake portion 100 is enhanced accordingly. Even when the snow enters the meander passage 300 from the outside air inlet portion 200 of the housing 1, the snow is restrained from freezing and from remaining at the meander passage 300 for a long period of time. Further, according to the present embodiment, even when the snow remains at the meander passage 300, the heat from the hot water tank 600 is transmitted to the meander passage 300 and the heat from the power generation chamber 10 where the engine 20 is driven is also transmitted to the meander passage 300. Thus, the snow that remains at the meander passage 300 is immediately melted so as to form the water. As illustrated in FIG. 2A, the first downward passage 303 positioned closest to the hot water tank 600 in the meander passage 300 is likely to cause the snow to be effectively melted. Because the first downward passage 303 is positioned at the upstream side of the drain port 500, the snow is likely to be melted at the upstream side of the drain port 500 and the water resulting from the melting of the snow is likely to be immediately discharged from the drain port 500. At this time, generally, the snow accumulated on the wall, and the like tends to remain accumulated on the wall and to freeze without flowing down even when the gravity is acting. However, because of the heat of the meander passage 300, the snow that remains at the meander passage 300 is melted to form the water to thereby include a high fluidity. Thus, the water effectively and immediately flows down to the drain portion 510 from the drain port 500 by the gravity. The water resulting from the melting of the snow that enters the meander passage 300 from the outside air inlet portion 200 is restrained from excessively remaining at the meander passage 300.

Further, according to the present embodiment, the meander passage 300 is formed to bend multiple times to obtain a complex shape. Thus, the flow speed at which the air entering the meander passage 300 from the outside air inlet portion 200 flows through the meander passage 300 is restrained from excessively increasing and is appropriately controlled. Specifically, as illustrated in FIG. 2A, the wall 300$k$ is provided to face the wall surface 606 serving as a bottom surface of the hot water tank 600. Thus, the air flowing through the first downward passage 303 in the downward direction (i.e., in the arrow E4 direction) tends to directly hit the wall 300$k$. The flow speed of the air flowing down in the arrow E4 direction through the first downward passage 303 is restrained from excessively increasing. That is, the flow speed of the air flowing through the first downward passage 303 is restrained. A time period during which the heat of the hot water tank 600 is transmitted to the air in the meander passage 300 (i.e., a heat transfer time) is appropriately ensured. The air entering the meander passage 300 from the outside air inlet portion 200 may be easily heated by the heat of the hot water tank 600. In this case, the snow such as the powder snow included in the air entering the meander passage 300 from the outside air inlet portion 200 is immediately melted to form the water. At the downstream side (area) of the drain port 500 in the meander passage 300, the snow that enters the meander passage 300 may be already melting down at a high rate. Thus, the snow is restrained from making contact with the heat sink 700 and freezing thereat. Even when the power generating apparatus according to the present embodiment is used for a long period of time, corrosion of the heat sink 700 caused by freezing of snow is restrained to thereby appropriately maintain the performance of the heat sink 700. Further, the heat sink 700 functions as a heat radiation portion of the control board 710 and the electrical components 715 when the power generating apparatus performs the power generating operation, thereby restraining the freezing of snow.

[Second Embodiment]

A second embodiment basically and substantially includes the same configurations and effects as those of the first embodiment and thus will be explained with reference to FIGS. 1 to 4. According to the second embodiment, in the same way as the first embodiment, the snow such as the powder snow that remains within the meander passage 300 of the intake portion 100 is gradually melted by the heat transfer from the power generation chamber 10 and the heat transfer from the engine 20 and the generator 22 of the power generation source 2. The resulting water from the melting snow drains down by the gravity so as to be discharged to the outside of the meander passage 300 from the drain port 500. Accordingly, the melting of the snow that remains within the meander passage 300 is enhanced. Even when the snow enters the meander passage 300 from the outside air inlet portion 200, the freezing of the snow is restrained so that the snow is restrained from remaining within the meander passage 300 for a long period of time and from entering the power generation chamber 10.

According to the second embodiment, in the same way as the first embodiment, the lining layers 350 having a greater sound absorbability than metal are lined at the walls constituting the meander passage 300. The driving sound of the engine 20 and the generator 22 in the power generation chamber 10 is restrained from leaking to the outside from the outside air inlet portion 200. Further, respective surfaces of the lining layers 350 being exposed to a void defined within the meander passage 300 include hydrophilicity. For example, a hydrophilic membrane including a hydrophilic material such as hydrophilic polymer, silica and titania is provided at at least the surfaces of the lining layers 350. At this time, the water generated by the melting of the snow at the meander passage 300 is formed into a water film shape so as to easily drain down by the gravity along the surfaces of the lining layers 350 having the hydrophilicity. In this case, the water is immediately collected at the wall 300$k$ serving as the bottom portion of the meander passage 300. The water that is collected at the wall 300$k$ is immediately discharged to the drain portion 510 outside the meander passage 300 from the drain port 500 by the gravity. The hydrophilicity mentioned above corresponds to a state where a contact angle of the water relative to a surface is small so that the water is blends with the surface. The hydrophilicity generally corresponds to the contact angle θ of the water being less than 90 degrees.

[Third Embodiment]

A third embodiment basically and substantially includes the same configurations and effects as those of the first embodiment and thus will be explained with reference to FIGS. 1 to 4. According to the third embodiment, the snow such as the powder snow that remains within the meander passage 300 of the intake portion 100 is gradually melted by the heat transfer from the power generation chamber 10 and the heat transfer from the engine 20 and the generator 22 of the power generation source 2. The resulting water from the melting snow drains down by the gravity so as to be discharged to the outside of the meander passage 300 from the drain port 500. Accordingly, the melting of the snow that remains within the meander passage 300 is enhanced. Even when the snow enters the meander passage 300 from the outside air inlet portion 200, the freezing of the snow is restrained so that the snow is restrained from remaining at the meander passage 300 for a long period of time.

According to the third embodiment, the lining layers 350 having the greater sound absorbability than metal are also lined at the walls constituting the meander passage 300. The driving sound of the engine 20 and the generator 22 in the power generation chamber 10 is restrained from leaking to the outside from the outside air inlet portion 200. At least a surface portion of each of the lining layers 350 includes a great number of connection pores. The surface portion is made of a porous sponge-like material so as to have a water absorbability. At this time, the water generated by the melting of the snow at the meander passage 300 drains down by the gravity so as to be collected at the wall 300$k$ (i.e., a wall where the drain port 500 is formed) serving as the bottom portion of the meander passage 300. The water that is collected at the wall 300$k$ is immediately discharged to the drain portion 510 from the drain port 500 by the gravity. Even in a case where some of the water is prevented from being discharged, the water not discharged is absorbed by the lining layer 350. Thus, the water resulting from the melting of the snow is restrained from entering the power generation chamber 10. The rainwater entering the meander passage 300 from the outside air inlet portion 200 is also restrained from entering the power generation chamber 10. The water absorbed by the lining layer 350 is expected to be gradually draying by means of the heat radiation from the power generation source 2 when the power generation source 2 is operating. When the snowfall ends, the water absorbed by the lining layer 350 is gradually drying by means of the air taken into the meander passage 300 from the outside or the heat radiation from the hot water tank 600.

[Fourth Embodiment]

A fourth embodiment basically and substantially includes the same configurations and effects as those of the first embodiment and thus will be explained with reference to FIGS. 1 to 4. According to the fourth embodiment, the snow such as the powder snow that remains within the meander passage 300 of the intake portion 100 is gradually melted by the heat transfer from the power generation chamber 10 and the heat transfer from the engine 20 and the generator 22 of the power generation source 2. The resulting water from the melting snow drains down by the gravity so as to be discharged to the outside of the meander passage 300 from the drain port 500. Accordingly, the melting of the snow that remains within the meander passage 300 is enhanced. Even when the snow enters the meander passage 300 from the outside air inlet portion 200, the freezing of the snow is restrained so that the snow is restrained from remaining at the meander passage 300 for a long period of time.

According to the fourth embodiment, the lining layers 350 having the greater sound absorbability than metal are also lined at the walls constituting the meander passage 300. The driving sound of the engine 20 and the generator 22 in the power generation chamber 10 is restrained from leaking to the outside from the outside air inlet portion 200. Further, the surface of each of the lining layers 350 includes a high water repellency. In this case, a membrane including a fluorine compound is layered on the surface of each of the lining layers 350 as needed. The water repellency corresponds to a behavior to shed the water. The water repellency corresponds to a difficulty to get wet by water and corresponds to a state where the contact angle θ between the water and an object is large. The contact angle θ of a droplet of water on a surface of the object is generally an index of the water repellency. A state where the contact angle θ is equal to or greater than 90 degrees indicates a water repellency (a hydrophobicity). More specifically, a state where the contact angle θ falls within a range from 110 degrees to 150 degrees indicates a high water repellency. In addition, a state where the contact angle θ is equal to or greater than 150 degrees indicates a super water repellency. The water repellency according to the embodiments includes the high water repellency and the super water repellency.

The water generated by the melting of the snow in the meander passage 300 is shed and formed into droplets. The water in droplets naturally falls down along the surface of the lining layer 350 having the water repellency by the gravity to move to the wall 300k serving as the bottom portion of the meander passage 300. Because the drain port 500 is formed at the wall 300k of the meander passage 300, the water easily drains down to the drain portion 510 from the drain port 500 by the gravity. The snow such as the powder snow entering the meander passage 300 from the outside air inlet portion 200 is first melted by the heat of the hot water tank 600 so as to be converted to the water. Then, the water is actively discharged to the outside of the meander passage 300 from the drain port 500. Thus, the humidity of the meander passage 300 is restrained from excessively increasing. The air thus obtained in the meander passage 300 is supplied to the engine 20 in the power generation chamber 10 to thereby appropriately ensure the driving ability of the engine 20.

[Fifth Embodiment]

A fifth embodiment will be explained with reference to FIG. 5. The fifth embodiment basically and substantially includes the same configurations and effects as those of the first embodiment. According to the fifth embodiment, the snow such as the powder snow that remains within the meander passage 300 of the intake portion 100 is gradually melted by the heat transfer from the power generation chamber 10 and the heat transfer from the engine 20 and the generator 22 of the power generation source 2. The resulting water from the melting snow drains down by the gravity so as to be discharged to the outside of the meander passage 300 from the drain port 500. Accordingly, the melting of the snow that remains within the meander passage 300 is enhanced. Even when the snow enters the meander passage 300 from the outside air inlet portion 200, the freezing of the snow is restrained so that the snow is restrained from remaining at the meander passage 300 for a long period of time.

Figure 5:
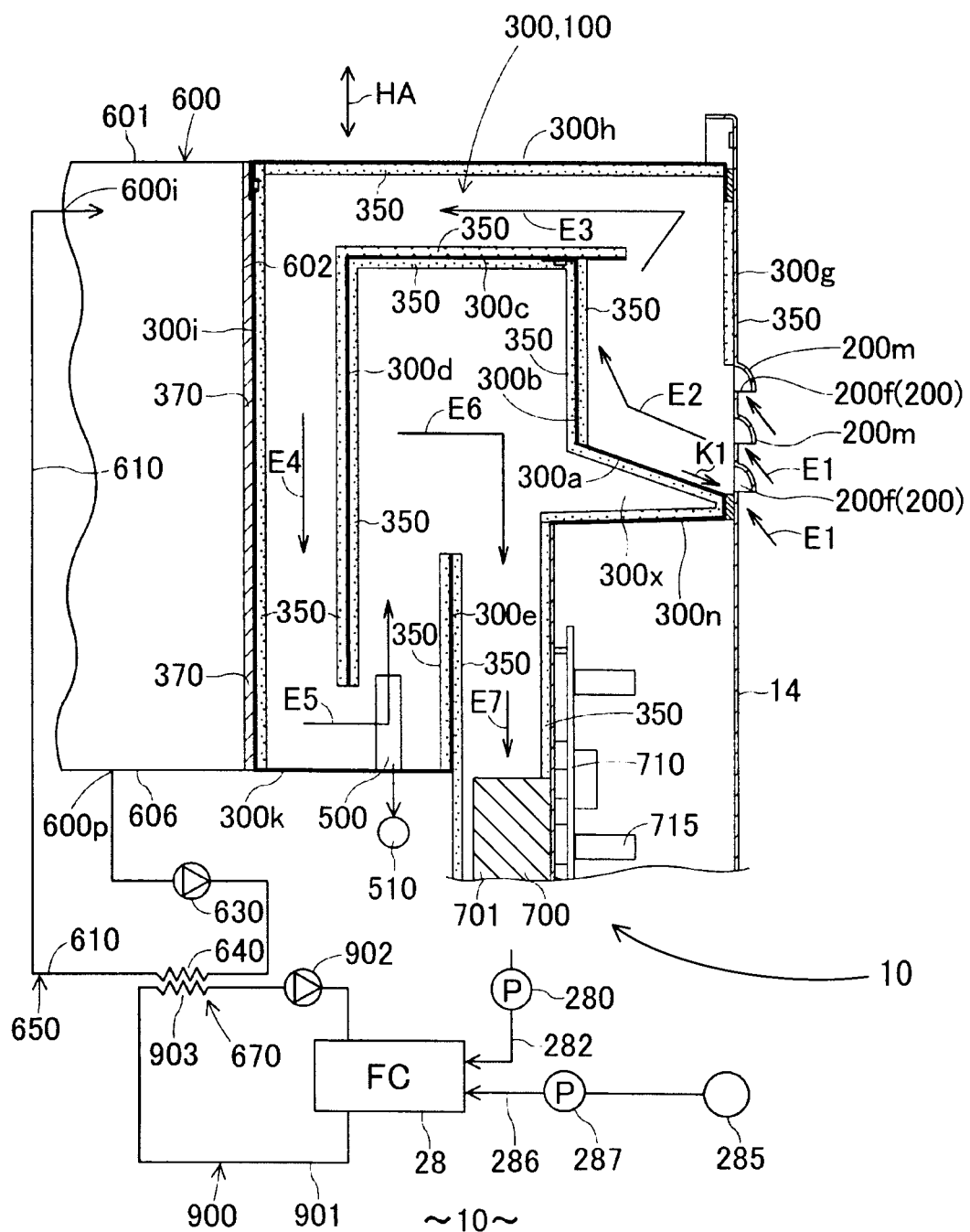
FIG. 5 is a cross-sectional view illustrating the structure of the intake portion provided at the housing according to a fifth embodiment.

As illustrated in FIG. 5, the lining layers 350 made of a porous and sound absorbable material are lined at the walls 300a to 300n constituting the meander passage 300. Therefore, the driving sound of the engine 20 and the generator 22 at the power generation chamber 10 is restrained from leaking to the outside from the outside air inlet portion 200. As illustrated in FIG. 5, a fuel cell 28 is arranged at the power generation chamber 10. The fuel cell 28 may be a polymer electrolyte fuel cell (PEFC), a solid oxide fuel cell (SOFC), a phosphoric acid fuel cell (PAFC), a molten carbonate fuel cell (MCFC), or the like. In a case where a pump 280 serving as a cathode gas delivery source arranged in the power generation chamber 10 is driven, the air in the power generation chamber 10 is supplied, as a cathode gas, to a cathode of the fuel cell 28 via an air passage 282. In addition, a fuel of a fuel source 285 is supplied to an anode of the fuel cell 28 from a pump 287 via a fuel passage 286. The fuel cell 28 generates the electric power accordingly. That is, the fuel cell 28 generates the electric power by a fuel and an oxidant. The lining layers 350 may have either water repellency, hydrophilicity, or water absorbability.

As illustrated in FIG. 5, the fuel cell 28 is provided with and connected to a fuel cell cooling water circulation means 900. The fuel cell cooling water circulation means 900 includes a circulation passage 901 and circulating a fuel cell cooling water that is heated by the exhaust heat of the fuel cell 28, a pump 902 provided at the circulation passage 901 and serving as a fuel cell cooling water delivery source, and a heat transfer portion 903 having a heat exchanger function. The hot water tank passage 650 is connected to the hot water tank 600 storing the hot water for the heater and/or the hot-water supply. The hot water tank passage 650 is heated by the fuel cell cooling water that is heated by the exhaust heat of the fuel cell 28. The hot water at approximately 30° C. to 90° C., for example, is stored in the hot water tank passage 650 even in the wintertime. The hot water tank passage 650 includes the circulation passage 610 and connected to the entrance 600i and the exit 600p of the hot water tank 600, the pump 630 serving as a water delivery source, and the heat transfer portion 640. The heat transfer portions 640 and 803 form the heat exchanger 670. The heat exchanger 670 transfers the heat of the fuel cell cooling water flowing through the circulation passage 901 of the fuel cell cooling water circulation means 900 to the water in the hot water tank passage 650 to thereby obtain the hot water. The hot water is stored in the hot water tank 600.

As illustrated in FIG. 5, because the hot water tank 600 is arranged adjacent to the meander passage 300, the heat of the hot water in the hot water tank 600 is transferred to the meander passage 300. The fuel cell 28 that performs the power generating operation emits heat to thereby increase the temperature of the power generation chamber 10. The heat of the heated power generation chamber 10 is transmitted to the meander passage 300. The hot water tank 600 is arranged next to the meander passage 300 via a heat transfer layer 370 having the high heat conductivity. The heat transfer layer 370 is made of a material having the high heat conductivity such as aluminum, aluminum alloy, copper, and copper alloy. The heat of the hot water tank 600 is transmitted to the meander passage 300 by means of the heat transfer layer 370, which leads to the melting of the snow that remains in the meander passage 300. During warmer seasons such as the summertime, the heat of the hot water tank 600 transferred to the meander passage 300 causes a preheating of the air supplied to the power generation chamber 10. In this case, the temperature of the air as the cathode gas supplied to the cathode of the fuel cell 28 that is arranged at the power generation chamber 10 increases, which leads to an increased output of the fuel cell 28.

[Sixth Embodiment]

Figure 6:
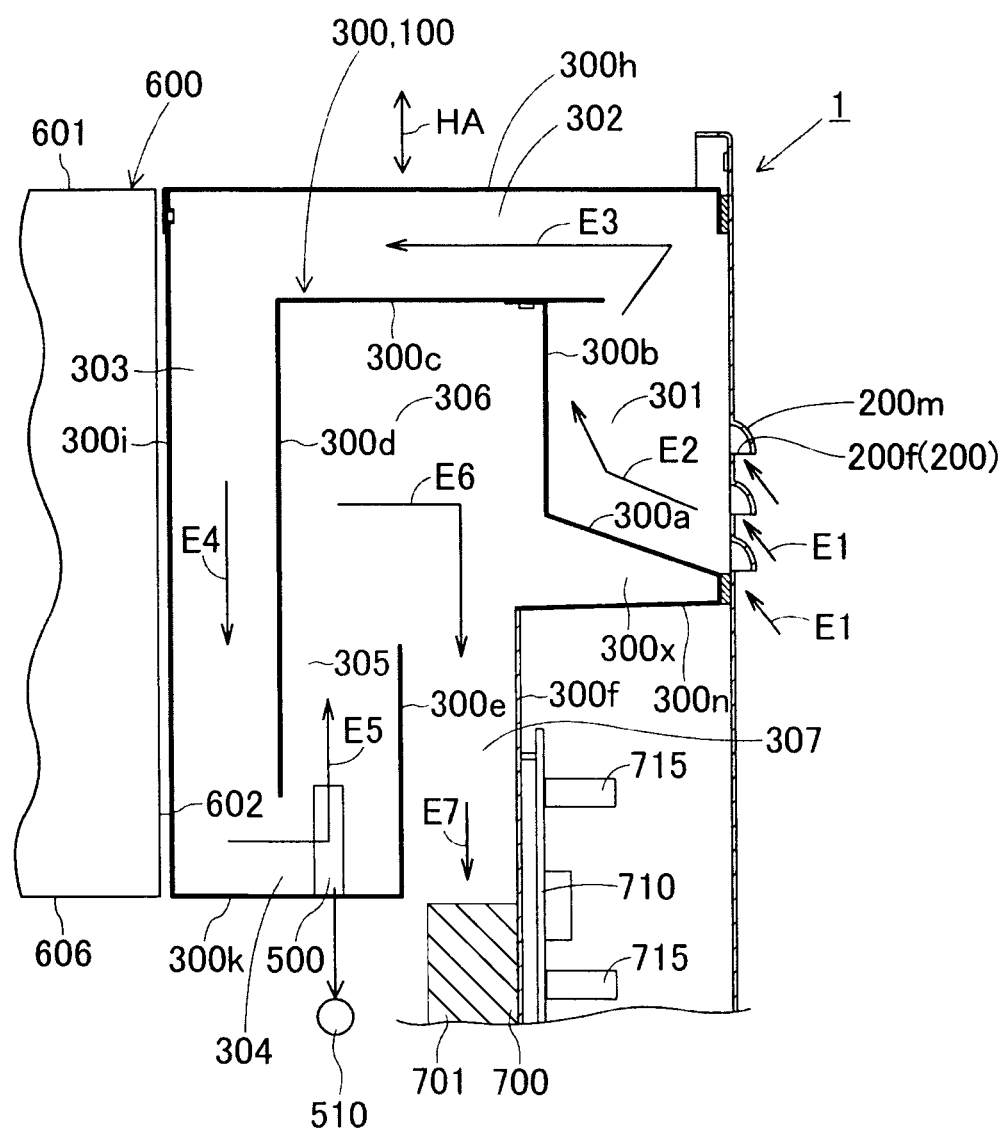
FIG. 6 is a cross-sectional view illustrating the structure of the intake portion provided at the housing according to a sixth embodiment.

A sixth embodiment will be explained with reference to FIG. 6. The sixth embodiment basically and substantially includes the same configurations and effects as those of the first embodiment. According to the sixth embodiment, however, the lining layers 350 having the sound absorbability are not lined at the walls forming the meander passage 300. Because the walls 300a to 300n are made of metal having the high heat conductivity, the heat of the hot water tank 600 and/or the power generation chamber 10 is easily and immediately transferred to the meander passage 300. Thus, in the wintertime, cold environments, and the like, the snow entering the meander passage 300 from the outside air inlet portion 200 is likely to be immediately melted. In addition, the water in the liquid sate resulting from the melting of the snow is easily discharged to the outside of the meander passage 300 from the drain port 500. The metal of which the walls 300a to 300n are made correspond to carbon steel, alloy steel, aluminum, aluminum alloy, copper, copper alloy, titanium, or titanium alloy, for example. Because the lining layers 350 are not provided, a flow passage area of the meander passage 300 is ensured, thereby achieving a downsizing of the power generating apparatus.

[Seventh Embodiment]

Figure 7:
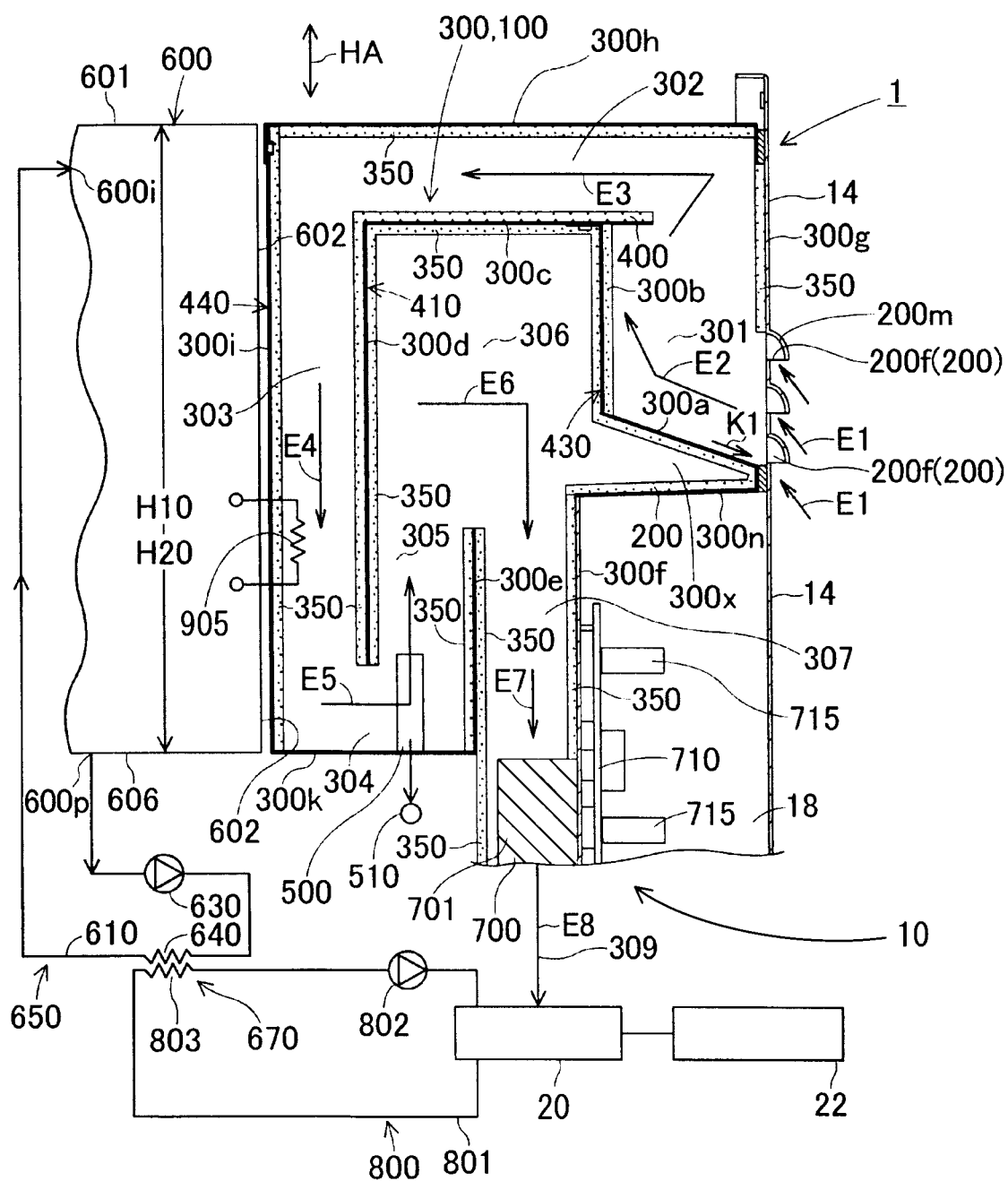
FIG. 7 is a cross-sectional view illustrating the structure of the intake portion provided at the housing according to a seventh embodiment.

A seventh embodiment will be explained with reference to FIG. 7. The seventh embodiment basically and substantially includes the same configurations and effects as those of the first to sixth embodiments. In a case where the electric power generated by the power generation source 2 exceeds a power consumption by the electric power load such as a light, a motor, and a heater, an excess electric power is obtained. According to the seventh embodiment, a heater 905 serving as a reverse power flow prevention heater is provided so that the excess electric power is consumed as the heat, not supplied to a commercial power source. When the electric power generated by the power generation source 2 is larger than the electric power consumed by the electric power load, a control unit controls the excess electric power to be consumed as the heat of the heater 905. The heater 905 may be provided at the meander passage 300. Specifically, the heater 905 may be provided at the upstream side of the drain port 500 at the first downward passage 303. At this time, however, the heater 905 may be provided at any portions as long as the heater 905 transmits the heat within the meander passage 300. For example, the heater 905 may be provided within the power generation chamber 10, the hot water tank 600, and the circulation passage 610. The snow and the like entering the meander passage 300 is melted by the heat generated by the heater 905 so that the water is discharged from the drain port 500. Even when the electric power generated by the power generation source 2 is less than the electric power consumed by the electric power load, the control nit controls the heater 905 to generate heat in a case of a great snow intrusion caused by a heavy snowstorm. The heater 905 may include a water prevention structure and an anti-icing structure. The lining layers 350 may have either water repellency, hydrophilicity, or water absorbability. The evaporation of water in contact with or absorbed at the lining layers 350 is enhanced by the heater 905 accordingly.

[Eighth Embodiment]

Figure 8A:
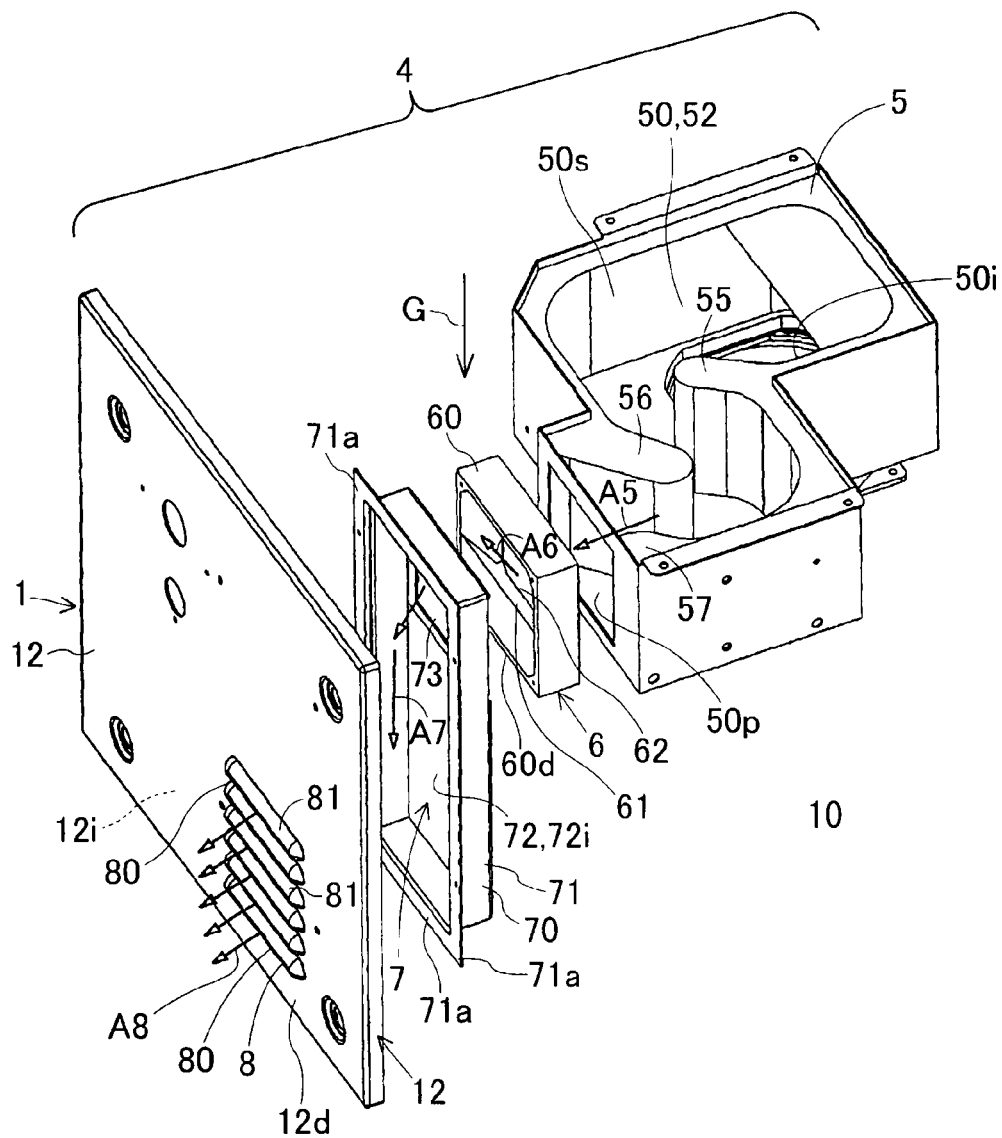
FIG. 8A is an exploded perspective view illustrating an exhaust structure provided at the housing according to an eighth embodiment.
Figure 8B:
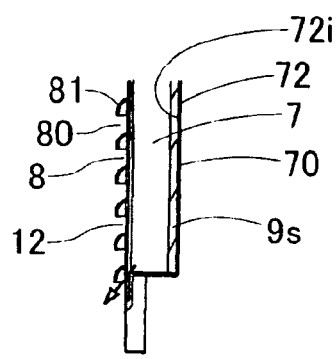
FIG. 8B is a partial enlarged sectional view of a diversion passage illustrated in FIG. 8A.

An eighth embodiment will be explained with reference to FIGS. 8 to 10. The eighth embodiment basically and substantially includes the same configurations and effects as those of the first embodiment. The eighth embodiment includes features on an exhaust structure. As illustrated in FIG. 8A, the exhaust passage 4 includes a sound absorbing duct 5, a weir member 6, a weir passage 62, a diversion passage 7, and the exhaust port 8. The sound absorbing duct 5 connected to the power generation chamber 10 includes a sound absorption bending passage 50. The sound absorbing duct 5 is made of a porous and sound absorbable material such as a porous body (for example, foamed urethane resin). The weir member 6 arranged at the downstream side of the sound absorbing duct 5 includes a weir portion 61. The weir passage 62 is formed by the weir portion 61 of the weir member 6. The diversion passage 7 is provided at the downstream side of the weir portion 61. The diversion passage 7 changes the flow direction of the exhaust gas from a direction where the exhaust gas flows from an exit opening 50p of the sound absorption bending passage 50 to the weir passage 62, i.e., in arrows A5 and A6 directions, to a direction perpendicular to the arrows A5 and A6 directions, i.e., in an arrow A7 direction corresponding to the downward direction in the gravity direction. The exhaust port 8 is provided at an end side (specifically, a lower end side) of the diversion passage 7 so as to expose to the outside air while opening to the exterior panel 12 of the housing 1. The exhaust port 8 opens to a lower portion 12d of the exterior panel 12 and includes the multiple laterally-elongated bores 80 laterally extending and covers 81 covering respective upper portions of the laterally elongated bores 80.

Figure 9:
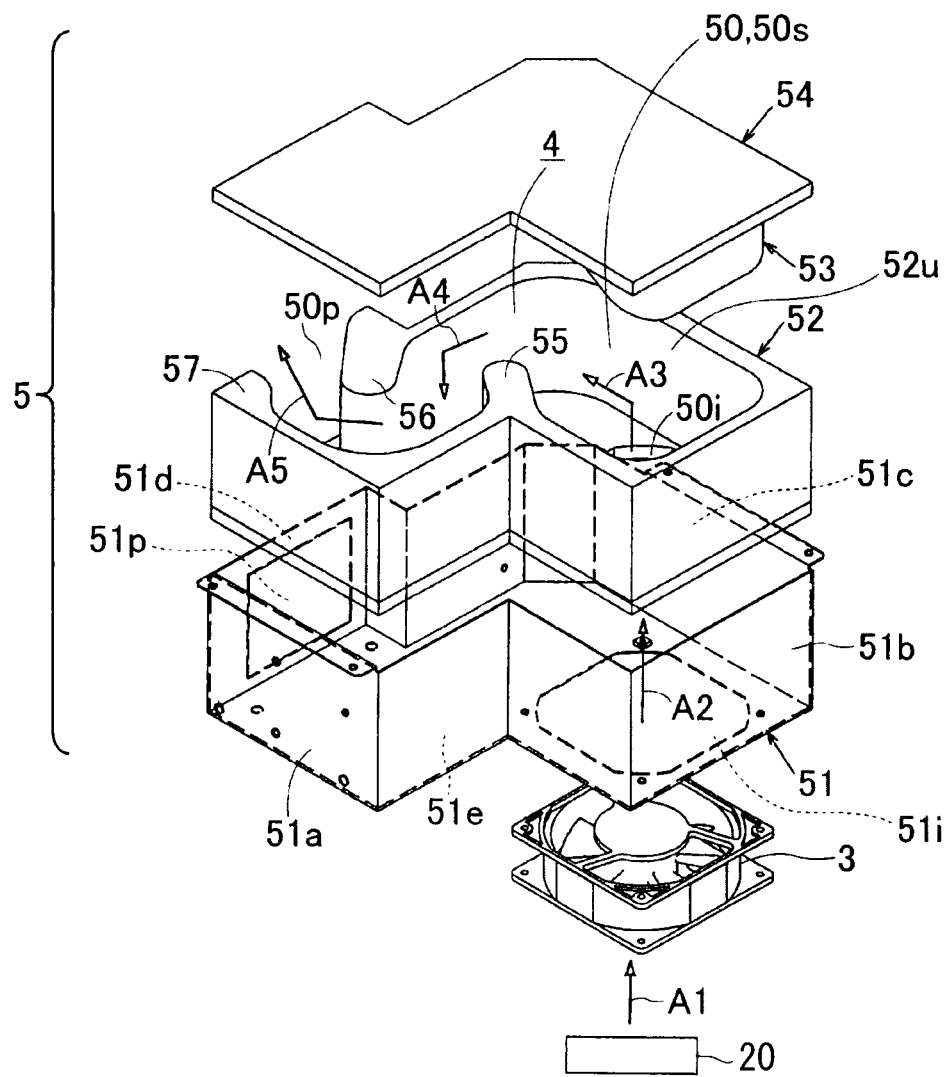
FIG. 9 is an exploded perspective view illustrating a sound absorbing duct of the exhaust structure according to the eighth embodiment.

As illustrated in FIG. 9, the sound absorbing duct 5 includes a duct cover 51, a duct side wall 52, and a duct ceiling portion 54. The duct cover 51, which serves as a case, is made of metal or resin. The duct side wall 52 is lined at an inner wall surface of the duct cover 51 and is made of the porous and sound absorbable material such as the porous body (for example, foamed urethane resin). The duct ceiling portion 54 includes an air regulation guide 53 having a projecting shape and made of the porous and sound absorbable material such as the porous body (for example, foamed urethane resin). The duct ceiling portion 54 is fitted to an upper opening 52u of the duct side wall 52 so as to be detachable relative thereto. In a case where the duct ceiling portion 54 is removed, the upper opening 52u of the duct side wall 52 is exposed, which leads to an easy cleaning and/or maintenance of the duct side wall 52.

As illustrated in FIG. 9, the duct cover 51 includes cover walls 51a, 51b, 51c, 51d, and a bottom wall 51e. The duct cover 51 also includes a fan opening 51i opening downwardly so as to face a ventilation fan 3 and an exit opening 51p opening laterally. The duct side wall 52 is made of the sound absorbable material. The duct side wall 52 includes the sound absorption bending passage 50 bending in multiple directions, a first protruding wall portion 55, a second protruding wall portion 56, and a third protruding wall portion 57. The first protruding wall portion 55 projects towards the sound absorption bending passage 50. The second protruding wall portion 56 projects towards the sound absorption bending passage 50 while facing the first protruding wall portion 55. The third protruding wall portion 57 projects towards the sound absorption bending passage 50 while facing the first and second protruding wall portions 56 and 57. The sound absorption bending passage 50 includes an S-shaped passage 50s, an inlet opening 50i, and an exit opening 50p. The S-shaped passage 50s is formed to bend in an S-shape in a plan view. The inlet opening 50i opens downward to the ventilation fan 3 in the vicinity of an entrance of the S-shaped passage 50s while facing the entrance opening 51i of the duct cover 51. The exit opening 50p opens laterally in the vicinity of an exit of the S-shaped passage 50s while facing the exit opening 51p of the duct cover 51.

Accordingly, in a case where the ventilation fan 3 is driven to rotate, the gas in the power generation chamber 10 having the heat flows upwardly in arrows A1 and A2 directions through the inlet openings 50i and 51i, and flows to turn in the arrows A3, A4, and A5 directions through the S-shaped passage 50s. The gas is finally discharged from the exit opening 50p. Because the exhaust gas flows three-dimensionally by turning multiple times within the duct side wall 52, a flow distance of the gas in the duct side wall 52 is ensured while a downsizing thereof is achieved, which may lead to a sound absorption including a sound reduction.

As illustrated in FIG. 9, the first, second, and third protruding wall portions 55, 56, and 57 are provided at different portions of the sound absorption bending passage 50 so as to face one another while forming the sound absorption bending passage 50. Thus, the exhaust gas flowing through the exhaust passage 4 turns multiple times, thereby ensuring the flow distance of the exhaust gas while achieving a downsizing of the sound absorbing duct 5. The sound absorption including the sound reduction may be obtained. As seen from FIG. 8A, the first, second, and third protruding wall portions 55, 56, and 57 have thick walls while extending in the height direction (i.e., in the gravity direction as indicated by the arrow G direction). As a result, the first, second, and third protruding wall portions 55, 56, and 57 have functions to forcedly change the direction of the exhaust gas flowing through the sound absorption bending passage 50 and to reinforce the porous duct side wall 52.

Figure 10B:
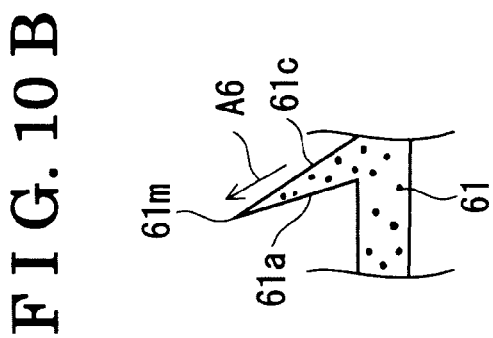
FIG. 10B is a partial enlarged cross-sectional view of a different example of a weir portion illustrated in FIG. 10A.
Figure 10A:
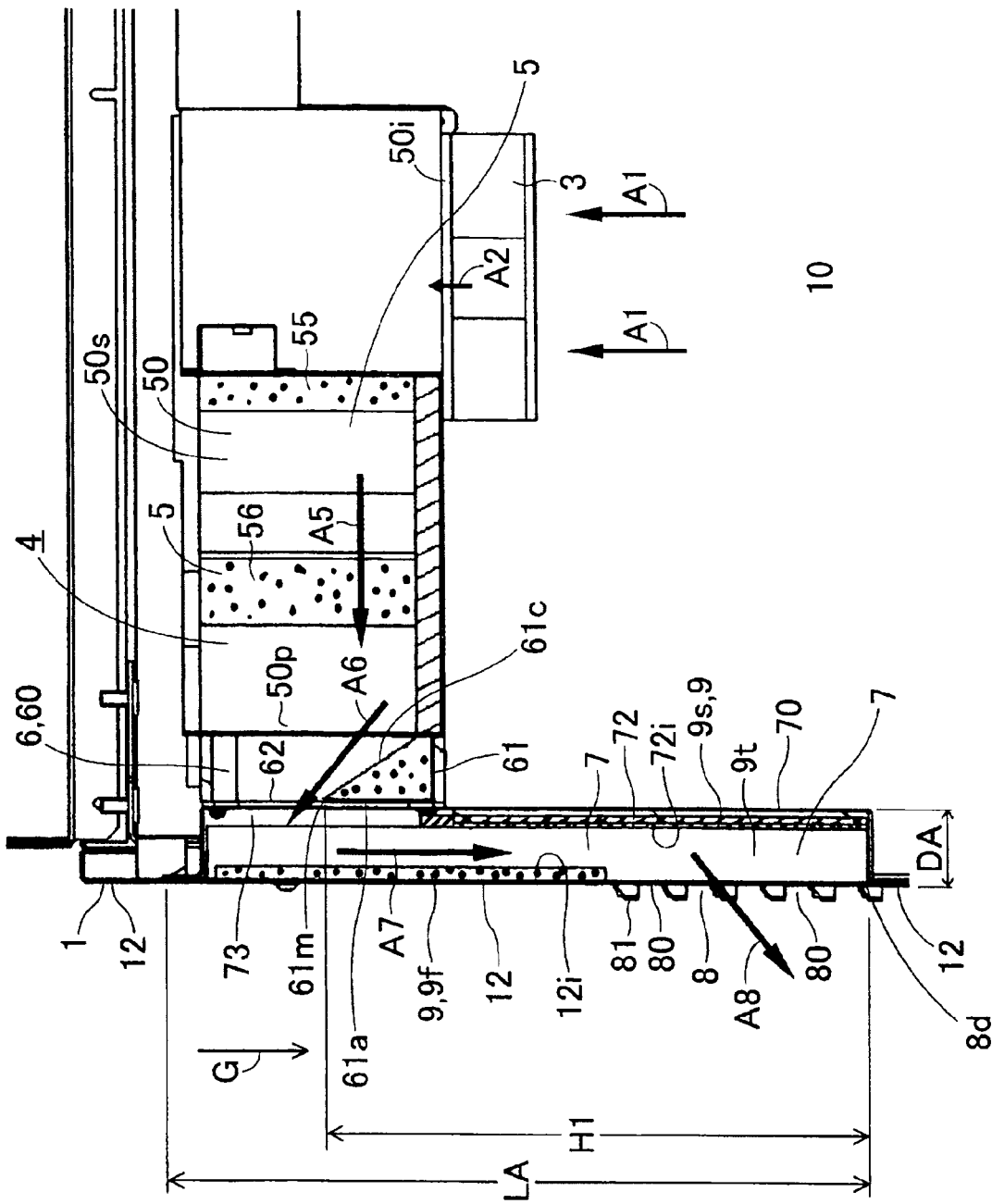
FIG. 10A is an enlarged cross-sectional view of the exhaust structure according to the eighth embodiment.

As illustrated in FIG. 10A, the diversion passage 7 is formed by an inner wall surface 12i of the exterior panel 12 constituting the side wall of the housing 1, and a diversion member 70 formed into a thin frame shape. As illustrated in FIG. 8A, the diversion member 70 includes a frame body 71, a vertically elongated wall portion 72, and a window portion 73. The frame body 71 is formed into a vertically elongated rectangular shape. The frame body 71 includes a flange portion 71a that extends outwardly. The vertically elongated wall portion 72 extends in the vertical direction (i.e., in the gravity direction indicated by the arrow G direction) so as to surround the frame body 71. The window portion 73 is formed at an upper side of the vertically elongated wall portion 72. The window portion 73 faces the weir passage 62. In this case, provided a vertical length in the gravity direction of the diversion member 70 is defined to be a length LA while a width of the diversion member 70 is defined to be a width DA as illustrated in FIG. 10, the length LA is defined to be much larger than the width DA. The diversion member 70 is formed so as to extend in the vertical direction. A ratio of the length LA to the width DA (LA/DA) may fall within a range from 5 to 100, specifically, from 5 to 50, more specifically, from 6 to 20. The diversion passage 7 formed by the diversion member 70 may be a vertically elongated thin passage. Thus, the snow such as the powder snow, the rainwater, and the like entering the diversion passage 7 from the exhaust port 8 is unlikely to flow upwardly through the diversion passage 7.

The snow, the rainwater, and the like entering the diversion passage 7 from the exhaust port 8 is discharged to the outside from one of the laterally elongated bores 80 provided at the lowest portion among the multiple bores 80. The diversion member 70 is formed into the vertically elongated shape to thereby ensure the flow distance of the diversion member 70. Accordingly, in a case of the heavy snowstorm outside, the snow, the rainwater, and the like entering the exhaust port 8 is restrained from reaching the window portion 73, the weir passage 62, the sound absorption bending passage 50 in the housing 1, and further the engine 20 and the generator 22 accommodated in the power generation chamber 10 serving as the engine compartment. As illustrated in FIG. 10, provided a length from a lower end 8d of the exhaust port 8 to a lower end of the weir passage 62 (i.e., a top portion 61m of the weir portion 61) is defined to be H1, the length H1 is greater than the width DA and smaller than the length LA (LA>H1>DA). The window portion 73 of the diversion member 70 faces the weir passage 62. A ratio of the length H1 to the width DA (H1/DA) may be basically substantially equal to the ratio of the length LA to the width DA (LA/DA).

As seen from FIG. 8A, the weir member 6 is positioned at the downstream side of the sound absorbing duct 5 and at the upstream side of the diversion member 70 in the flow direction of the exhaust gas from the engine 20. In addition, as seen from FIG. 10, the weir member 6 includes a weir frame 60 having a rectangular shape, the weir portion 61 upwardly projecting from a bottom portion 60d of the weir frame 60 to the top portion 61m, and the weir passage 62 positioned at the upper side of the weir portion 61 and opening laterally. The weir portion 61 may be made of the porous and sound absorbable material such as the porous body (for example, form represented by foamed resin, foam metal, and the like). The weir member 6 is arranged in the vicinity of the exit opening 50p of the sound absorbing duct 5 so as to face the exit opening 50p.

As illustrated in FIG. 10A, a sound absorbing body 9 that is made of the sound absorbable material such as the porous body (for example, form represented by foamed resin, foam metal, and the like) is provided at the diversion passage 7. In a case where the sound absorbable material is porous, a pore in the porous body may be an open pore or a closed pore. The sound absorbing body 9 includes a first absorbing body 9f, a second absorbing body 9s, and a third absorbing body 9t so as to expose to the diversion passage 7. The first absorbing body 9f is lined at the inner wall surface 12i of the exterior panel 12 opposing to the outside air. The second absorbing body 9s is lined at an inner wall surface 72i of the vertically elongated wall portion 72 of the diversion member 70. The third absorbing body 9t is provided between the first absorbing body 9f and the second absorbing body 9s. Accordingly, the diversion member 70 except for the window portion 73 is lined by the sound absorbable material. The diversion passage 7 connects the exhaust port 8 of the housing 1 to the weir passage 62 in the height direction (i.e., in the gravity direction indicated by the arrow G in FIG. 10). The diversion passage 7 is thus formed to extend upwardly to the weir passage 62 in the gravity direction along the inner wall surface 12i of the exterior panel 12 of the housing 1 and the inner wall surface 72i of the vertically elongated wall portion 72 of the diversion member 70.

In a case where the power generating apparatus of the present embodiment is used, the fuel and the air added to the fuel are supplied to the combustion chamber of the engine 20 to thereby drive the engine 20. Then, the generator 22 is driven so as to generate the power. The air within the power generation chamber 10 having the heat emitted from the engine 20 flows as the exhaust gas through the exhaust passage 4 by the operation of the ventilation fan 3. That is, the exhaust gas flows through the inlet opening 50i, the sound absorption bending passage 50, the exit opening 50p, the weir passage 62, and the window portion 73 and further flows downward in the gravity direction (in the arrow G direction) through the diversion passage 7. The exhaust gas is finally discharged to the outside from the exhaust port 8. In this case, the exhaust gas flows in directions of the arrows A1, A2, A3, A4, A5, A6, A7, and A8 in order.

According to the present embodiment, as described above, the sound absorbing body 9 or the sound absorbable material is provided at the exhaust passage 4. The sound absorbing duct 5 made of the sound absorbable material is also provided at the exhaust passage 4. Further, the weir portion 61 is made of the sound absorbable material. Therefore, the operating sound of the engine 20, the generator 22, and the ventilation fan 3 may be reduced. Because the sound absorption bending passage 50 is formed to bend in the S-shape in the plan view, a propagation distance of sound is ensured while a downsizing of the sound absorbing duct 5 is obtained, thereby ensuring the decrease of the aforementioned operating sound. Furthermore, as seen from FIG. 10, the diversion passage 7 provided at the downstream side of the weir portion 61 changes the flow direction of the exhaust gas so as to flow downwardly in the gravity direction perpendicular to the flow direction of the exhaust gas from the exit opening 50p of the sound absorption bending passage 50 to the weir passage 62 (indicated by the arrows A5 and A6). Furthermore, the exhaust port 8 is provided at the lower end of the diversion passage 7. Even in a case where the power generating apparatus is used under the adverse weather conditions, the exhaust gas from the engine 20 flows through the exhaust passage 4 at a time of the driving of the engine 20 so as to be discharged from the exhaust port 8 of the housing 1. Therefore, the snow such as the powder snow and the rainwater in the outside air is restrained from entering the exhaust passage 4 from the exhaust port 8.

On the other hand, in a case where the power generating apparatus does not perform the power generating operation and the engine 20 is stopped, the exhaust gas is prevented from being emitted from the engine 20 to the outside through the exhaust port 8 of the housing 1. Thus, under the adverse weather conditions such as the heavy snowstorm and rain, the snow or rain may enter the diversion passage 7 of the housing 1 from the exhaust port 8. In a case of an idling of the engine 20, under the adverse weather conditions such as the heavy snowstorm and rain, the snow or rain may also enter the diversion passage 7 of the housing 1 from the exhaust port 8. Even in the aforementioned cases, according to the present embodiment, the snow or the rainwater entering the diversion passage 7 from the exhaust port 8 may not reach the weir passage 62 unless the snow or the rainwater moves upward against the gravity (in an opposite direction from the arrow A7 direction) in the diversion passage 7. The snow and the rainwater are restrained from entering the sound absorption bending passage 50 and further the engine 20 in the power generation chamber 10 accordingly. The diversion passage 7 has the thin passage so that the snow and the rainwater are unlikely to move upward against the gravity in the diversion passage 7 even when the snow or the rainwater enters the diversion passage 7 from the exhaust port 8.

As illustrated in FIG. 10A, the weir portion 61 includes a vertical wall surface 61a provided so as to face the diversion passage 7 and an inclined wall surface 61c so as to face the sound absorption bending passage 50. The vertical wall surface 61a extends upward in the gravity direction from the bottom portion 60d (see FIG. 8A) of the weir frame 60, i.e., extends upward in the vertical direction to the top portion 61m. The inclined wall surface 61c inclines upward to the top portion 61m in the direction where the exhaust gas flows (i.e., in the arrows A5 and A6 directions). Thus, the discharging ability of the exhaust gas flowing from the sound absorption bending passage 50 to the exhaust port 8 is ensured. The ventilation ability of the exhaust gas emitted from the engine 20 is ensured accordingly. Further, as illustrated in FIG. 10A, the vertical wall surface 61a constituting the weir portion 61 extends upward in the gravity direction from the bottom portion 60d of the weir frame 60, i.e., extends upward in the vertical direction to thereby exercise high disturbance characteristics against the snow, the rainwater, and further small substances such as dust entering the exhaust passage 4 from the exhaust port 8. The intrusion of the snow, the rainwater, the dust, and the like to the sound absorption bending passage 50 from the exhaust port 8 is efficiently restrained. Consequently, a durability and a long operating life of the power generating apparatus placed or installed outside may improve. The vertical wall surface 61a may not necessarily extend in the vertical direction and may incline in a direction where the inclined wall surface 61c inclines as illustrated in FIG. 10B.

The first to eighth embodiments are not limited to have the aforementioned configurations and may be appropriately changed or modified. The exhaust structure is not limited as illustrated in FIGS. 8 to 10.

According to the aforementioned embodiments, the hot water tank 600 (the heat supply portion) heated by the heat that is generated when the power generation source 2 operates may be provided at the meander passage 300 so that the heat of the hot water tank 600 is transmittable. The hot water tank 600 may be provided next to or substantially next to the meander passage 300. The hot water tank 600 may be provided next to the meander passage 300 so as to serve as the heat supply portion. The hot water tank 600 may be a tank storing the hot liquid to be used for the hot-water supply system, the heater, and the like. Alternatively, in a case where the power generation source 2 includes the engine, the hot water tank 600 may be a tank storing the engine cooling water. Further alternatively, in a case where the power generation source 2 includes the fuel cell, the hot water tank 600 may be a tank storing the cooling water of the fuel cell. The hot water tank 600 at least stores the hot water (hot liquid). The heat supply portion may be an exhaust pipe where the exhaust gas, having the high temperature and emitted from the engine 20, is discharged or may be a heat radiation portion heated by the heat radiation from the generator 22 in operation. Alternatively, in a case where the power generation source 2 includes the fuel cell, the heat supply portion may be a heat radiation portion heated by the heat from the fuel cell in operation. Further alternatively, in a case where a reformer for reforming a fuel source into an anode gas is provided, the heat supply portion may be a heat radiation portion emitting the heat related to a reforming reaction.

The power generation source 2, which is accommodated in the power generation chamber 10 of the housing 1, may be formed by the engine 20 driving the generator 22 or the fuel cell 28 generating the electric power by the fuel and the oxidant. The intake portion 100 suctions the air into the power generation chamber 10 so as to operate the engine 20 or the fuel cell 28. The meander passage 300 may include a vertical passage structure in which the outside air flows and turns multiple times upwardly and downwardly.

The exhaust port 8 is an opening from which the water remaining at the meander passage 300 is discharged to the outside thereof. The exhaust port 8 is provided at the meander passage 300. The hot water tank 600 is arranged next to the meander passage 300 so as to transfer the heat from the hot water tank 600 to the meander passage 300 for melting the snow that enters the meander passage 300.

The snow entering the meander passage 300 is highly likely melted at the downstream side of the exhaust port 8. Thus, the snow such as the powder snow is restrained from making contact with the heat sink 700. Even when the power generating apparatus according to the aforementioned embodiments is used for a long period of time, the corrosion of the heat sink 700 caused by the snow is restrained. The performance of the heat sink 700 is appropriately ensured for a long period of time. In addition, the electrical component 715 includes the electronic component. For example, the control board 710 may correspond to the electrical component 715. The control board 710 may include an electric power conversion system for converting the electric power generated by the generator 22 or the fuel cell 28 to an alternating current or a direct current. Further, the lining layer 350 (the sound absorbing layer) restrains the operating sound of the engine 20, the generator 22, the fuel cell 28, and the like in the power generation chamber 10 from leaking to the outside from the outside air inlet portion 200. The heat transfer layer 370 may be provided between the hot water tank 600 and the meander passage 300. In this case, the heat of the hot water tank 600 is effectively transmitted to the meander passage 300, thereby effectively melting the snow remaining at the meander passage 300.

According to the aforementioned embodiments, in a case of the adverse weather conditions, the snow such as the powder snow may enter from the outside air inlet portion 200 to the meander passage 300 of the housing 1 because of a strong driving wind, and the like. The meander passage 300 is formed to meander in the height direction from the outside air inlet portion 200 to the power generation chamber 10. The outside air from the outside air inlet portion 200 of the housing 1 is supplied to the power generation chamber 10 by flowing and turning multiple times along the meander passage 300. Thus, even when the snow such as the powder snow enters the meander passage 300 from the outside air inlet portion 200, the snow highly possibly hits the walls 300a to 300n constituting the meander passage 300. The snow is restrained from entering a further downstream side of the meander passage 300 from the outside air inlet portion 200. In this case, the snow may remain at the meander passage 300 without entering the power generation chamber 10.

As long as the power generation source 2 operates, the temperature at the power generation chamber 10 is greater than the outside temperature. Thus, the snow that remains within the meander passage 300 is gradually melted to form the water by the heat transmitted from the power generation chamber 10 and further the heat transmitted from the power generation source 2. The water flowing downward by the gravity is discharged to the outside of the meander passage 300 from the drain port 500. Accordingly, the melting of the snow such as the powder snow remaining within the meander passage 300 is enhanced at the upstream side of the power generation chamber 10. Even when the snow enters the meander passage 300 of the housing 1 from the outside air inlet portion 200, the freezing of the snow is restrained so that the snow is restrained from remaining within the meander passage 300 for a long period of time. The water in the liquid sate is discharged to the outside of the meander passage 300 from the drain port 500.

Specifically, according to the aforementioned embodiments, the meander passage 300 meanders so that the flow speed of the air entering the meander passage 300 from the outside air inlet portion 200 is restrained. Thus, the heat transfer time during which the heat of the power generation chamber 10 and/or the power generation source 2 is transmitted to the meander passage 300 is appropriately ensured. The air entering the meander passage 300 from the outside air inlet portion 200 may be easily heated. In this case, the snow such as the powder snow included in the air entering the meander passage 300 from the outside air inlet portion 200 is likely to be melted to form the water.

Accordingly, even when the snow such as the powder snow enters the housing 1 from the outside air inlet portion 200, the snow is restrained from remaining in the housing 1. The snow is restrained from freezing after entering the housing 1. In this case, the durability and the long operating life of the power generation source 2, members, components, and the like accommodated within the power generation chamber 10 are ensured and enhanced.

According to the aforementioned embodiments, the housing 1 accommodates the heat supply portion, i.e., the hot water tank 600 heated by the heat that is generated when the power generation source 2 is operated.

Accordingly, the heat, by which the snow such as the powder snow entering the meander passage 300 is melted, is transmitted from the hot water tank 600 to the meander passage 300. Therefore, even when the snow enters the meander passage from the outside air inlet portion because of the adverse weather conditions, the snow entering the meander passage is immediately melted to be formed into water.

In addition, according to the aforementioned embodiments, the heat supply portion includes the hot water tank 600 storing the heat as the hot liquid, the heat being generated when either one of the engine 20 and the fuel cell 28 is operated, the hot water tank 600 transmitting the heat to the meander passage 300 for melting snow that enters the meander passage 300.

Accordingly, the heat, by which the snow such as the powder snow entering the meander passage 300 is melted, is transmitted from the hot water tank 600 to the meander passage 300. Therefore, even when the snow enters the meander passage from the outside air inlet portion because of the adverse weather conditions, the snow entering the meander passage is immediately melted to be formed into water.

Further, according to the aforementioned embodiments, the power generating apparatus further includes the electrical component 715, wherein the electrical component 715 or the heat sink 700 for cooling the electrical component 715 is provided at a downstream area of the meander passage 300 in a flow direction of the outside air.

At the downstream side (downstream area) in the meander passage 300, the snow that enters the meander passage 300 may be already melting down at a high rate. Thus, the snow is restrained from making contact with the heat sink 700 and freezing thereat. Even when the power generating apparatus is used for a long period of time, corrosion of the heat sink 700 caused by freezing of snow is restrained to thereby appropriately maintain the performance of the heat sink 700. Further, the heat sink 700 functions as a heat radiation portion of the control board 710 and the electrical components 715 when the power generating apparatus performs the power generating operation, thereby restraining the freezing of snow.

Furthermore, according to the aforementioned embodiments, the lining layer 350 made of the sound absorbing material is provided at the inner wall surface of the meander passage 300.

Accordingly, a driving noise from the engine 20, the generator 22, and the like at the power generation chamber 10 is restrained from leaking to the outside of the power generating apparatus.

Furthermore, according to the aforementioned embodiments, a portion of the lining layer 350 facing the meander passage 300 has either one of a hydrophilicity, a water repellency, and a water absorbability.

In a case where the lining layer 350 has the hydrophilicity, the water generated by the melting of the snow at the meander passage 300 is formed into a water film shape so as to easily drain down by the gravity along the surface of the lining layer 350 having the hydrophilicity. The water collected to the bottom portion of the meander passage 300 is immediately discharged to the outside of the meander passage 300 by the gravity. In a case where the lining layer 350 has the water repellency, even in a case where some of the water is prevented from being discharged, the water not discharged is absorbed by the lining layer 350. Thus, the water resulting from the melting of the snow is restrained from entering the power generation chamber 10. In a case where the lining layer 350 has the water absorbability, the water generated by the melting of the snow in the meander passage 300 is shed and formed into droplets. The water in droplets naturally falls down along the surface of the lining layer 350 having the water repellency by the gravity to move to the bottom portion of the meander passage 300.

Furthermore, according to the aforementioned embodiments, the wall 300a constitutes one of multiple walls 300a to 300n, the meander passage 300 being defined by the multiple walls 300a to 300n, one of which includes the projecting portion 400 projecting towards the exterior panel (the side wall) 14 of the housing 1.

The projecting portion 400 projects towards the exterior panel 14 so as to laterally extend from an upper end of the wall 300b extending in a vertical direction and facing the exterior panel 14 at which the outside air inlet portion 200 is formed. That is, the projecting portion 400 extends in a direction perpendicular to the flow direction of the air flowing through the meander passage 300. The snow such as the powder snow is highly likely to hit the projecting portion 400 serving as a baffle plate member before flowing to the first lateral passage 302 from the first upward passage 301. Thus, the further intrusion of the snow is restrained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An outdoor power generating apparatus, comprising:
a housing including a power generation chamber;
a power generation source accommodated in the power generation chamber and formed by either one of an engine driving a generator or a fuel cell generating an electric power by a fuel and an oxidant;
an intake portion provided within the housing and positioned at an upper side of the power generation source, the intake portion including an outside air inlet portion that opens to a side wall of the housing to bring an outside air within the housing, the intake portion including a meander passage that connects the outside air inlet portion to the power generation chamber while bringing the outside air to meander from the outside air inlet portion towards the power generation chamber; and
a drain port provided at the meander passage and discharging a water in a liquid state that remains at the meander passage to an outside of the meander passage,
wherein the meander passage includes a labyrinth structure turning multiple times in a height direction such that a flow passage between the outside air inlet portion and the power generation chamber is separated into multiple portions while bending.

2. The outdoor power generating apparatus according to claim 1, wherein the housing accommodates a heat supply portion heated by a heat that is generated when the power generation source is operated.

3. The outdoor power generating apparatus according to claim 2, wherein the heat supply portion includes a hot liquid tank storing a heat as a hot liquid, the heat being generated when either one of the engine and the fuel cell is operated, the hot liquid tank transmitting the heat to the meander passage.

4. The outdoor power generating apparatus according to claim 1, further comprising an electrical component,
wherein the electrical component is provided at a downstream end of the meander passage in a flow direction of the outside air, or a heat sink in thermal contact with the electrical component is provided at the downstream area of the meander passage in the flow direction of the outside air.

5. The outdoor power generating apparatus according to claim 1, wherein a sound absorbing layer made of a sound absorbing material is provided at an inner wall surface of the meander passage.

6. The outdoor power generating apparatus according to claim 5, wherein a portion of the sound absorbing layer facing the meander passage has one of a hydrophilicity, a water repellency, or a water absorbability.

7. The outdoor power generating apparatus according to claim 1, wherein the meander passage includes
a first upward passage connected to the outside air inlet portion,
a first lateral passage laterally extending from an end of the first upward passage,
a first downward passage extending downward from an end of the first lateral passage,
a first diversion passage extending from an end of the first downward passage so as to change a flow direction of air from a downward direction to an upward direction,
a second upward passage extending upward from the first diversion passage,
a second diversion passage extending from an end of the second upward passage so as to change the flow direction of the air from the upward direction to the downward direction, and
a second downward passage extending from the second diversion passage towards the power generation chamber.

8. The outdoor power generating apparatus according to claim 7, wherein the drain port is provided at the first diversion passage of the meander passage.

9. An outdoor power generating apparatus, comprising;
a housing including a power generation chamber;
a power generation source accommodated in the power generation chamber and formed by either one of an engine driving a generator or a fuel cell generating an electric power by a fuel and an oxidant;
an intake portion provided within the housing and positioned at an upper side of the power generation source, the intake portion including an outside air inlet portion that opens to a side wall of the housing to bring an outside air within the housing, the intake portion including a meander passage that connects the outside air inlet portion to the power generation chamber while bringing the outside air to meander from the outside air inlet portion towards the power generation chamber;
a wall downwardly inclining to the outside air inlet portion; and
a drain port provided at the meander passage and discharging a water in a liquid state that remains at the meander passage to an outside of the meander passage,
wherein the meander passage includes a labyrinth structure turning multiple times in a height direction such that a flow passage between the outside air inlet portion and the power generation chamber is separated into multiple portions while bending.

10. The outdoor power generating apparatus according to claim 9, wherein the housing accommodates a heat supply portion heated by a heat that is generated when the power generation source is operated.

11. The outdoor power generating apparatus according to claim 10, wherein the heat supply portion includes a hot liquid tank storing a heat as a hot liquid, the heat being generated when either one of the engine and the fuel cell is operated, the hot liquid tank transmitting the heat to the meander passage.

12. The outdoor power generating apparatus according to claim 9, further comprising an electrical component,
wherein the electrical component is provided at a downstream end of the meander passage in a flow direction of the outside air, or a heat sink in thermal contact with the electrical component is provided at the downstream area of the meander passage in the flow direction of the outside air.

13. The outdoor power generating apparatus according to claim 9, wherein a sound absorbing layer made of a sound absorbing material is provided at an inner wall surface of the meander passage.

14. The outdoor power generating apparatus according to claim 13, wherein a portion of the sound absorbing layer facing the meander passage has one of a hydrophilicity, a water repellency, or a water absorbability.

15. The outdoor power generating apparatus according to claim 9, wherein the wall constitutes one of multiple walls, the meander passage being defined by the multiple walls, one of which includes a projecting portion projecting towards the side wall of the housing.

16. The outdoor power generating apparatus according to claim 9, wherein the meander passage includes
a first upward passage connected to the outside air inlet portion,
a first lateral passage laterally extending from an end of the first upward passage,
a first downward passage extending downward from an end of the first lateral passage,
a first diversion passage extending from an end of the first downward passage so as to change a flow direction of air from a downward direction to an upward direction,
a second upward passage extending upward from the first diversion passage,
a second diversion passage extending from an end of the second upward passage so as to change the flow direction of the air from the upward direction to the downward direction, and
a second downward passage extending from the second diversion passage towards the power generation chamber.

17. The outdoor power generating apparatus according to claim 16, wherein the drain port is provided at the first diversion passage of the meander passage.

* * * * *